US009030928B2

(12) United States Patent
Fujihira et al.

(10) Patent No.: US 9,030,928 B2
(45) Date of Patent: May 12, 2015

(54) COMMUNICATION SYSTEM, COMMUNICATION METHOD AND NETWORK MANAGEMENT APPARATUS

(71) Applicant: Hitachi, Ltd., Tokyo (JP)

(72) Inventors: Kenji Fujihira, Yokohama (JP); Masayuki Takase, Yokohama (JP); Tetsuya Uda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 13/644,775

(22) Filed: Oct. 4, 2012

(65) Prior Publication Data

US 2013/0272116 A1    Oct. 17, 2013

(30) Foreign Application Priority Data

Oct. 7, 2011    (JP) .................................. 2011-222683

(51) Int. Cl.
*H04L 12/26* (2006.01)
*H04L 12/24* (2006.01)

(52) U.S. Cl.
CPC ........ *H04L 41/0654* (2013.01); *H04L 41/0659* (2013.01)

(58) Field of Classification Search
CPC ................................ H04L 45/22; H04L 41/06
See application file for complete search history.

(56) References Cited

U.S. PATENT DOCUMENTS

2009/0239520 A1*  9/2009  Inagaki et al. ............. 455/422.1
2011/0075550 A1*  3/2011  Sultan et al. .................. 370/217

FOREIGN PATENT DOCUMENTS

| JP | 2006-340058 A | 12/2006 |
| JP | 2008-061196 A | 3/2008 |
| JP | 2009-060673 A | 3/2009 |
| JP | 2009-231861 A | 10/2009 |

* cited by examiner

*Primary Examiner* — Chi H Pham
*Assistant Examiner* — Fahmida Chowdhury
(74) *Attorney, Agent, or Firm* — Foley & Lardner LLP

(57) ABSTRACT

In an example of the invention, network devices are classified into areas. Each of the areas includes edge nodes. A network management apparatus retains fault information including values each indicating whether or not a fault has occurred in each of the areas, retains detour path information including values indicating edge nodes, values indicating alternative areas to the areas and priorities assigned to the alternative areas, identifies, when determined that a fault has occurred in a first area based on the fault information, an alternative area to the first area based on the detour path information, determines, when determined that the fault has not occurred in the identified alternative area, the identified alternative area as a second area through which the active path passes, determines two edge nodes included in the second area, and detect network devices through which the active path passes between the two edge nodes.

15 Claims, 17 Drawing Sheets

FIG. 4

AREA STATUS TABLE

| | AREA | STATUS |
|---|---|---|
| 403 | A | NORMAL |
| 404 | B | FAULT |
| 405 | C | NORMAL |
| 406 | D | NORMAL |
| 407 | E | NORMAL |
| 408 | F | NORMAL |
| 409 | G | NORMAL |
| 410 | H | FAULT |

FIG. 5

DETOUR PATH SEARCH TABLE

| ROUTING EDGE NODE (BEFORE CHANGE) | FAULT AREA | SELECTION PRIORITY | NORMAL AREA | ROUTING EDGE NODE (AFTER CHANGE) |
|---|---|---|---|---|
| 2, 3, 4, 5 | Area B | 1 | A, E, C | 7, 15, 16, 10 |
| | | 2 | A, G, C | 11, 25, 26, 12 |
| 14, 8, 9, 17 | Area B | 1 | D, H, F | 29, 31, 32, 30 |
| | | 2 | D, G, F | 23, 27, 28, 24 |
| | | 3 | D, E, F | 19, 20, 21, 22 |

FIG. 6

PATH PRIORITY TABLE

| PATH ID (441) | PRIORITY (442) |
|---|---|
| 1 | 7 |
| 2 | 5 |

443 → row 1; 444 → row 2; 114

FIG. 7

AREA FAULT DETERMINATION TABLE

| AREA (461) | DEPLOYED NODE COUNT (462) | FAULT NODE COUNT (463) | AREA FAULT THRESHOLD VALUE (%) (464) |
|---|---|---|---|
| A | 10 | 0 | 50 |
| B | 20 | 15 | 50 |
| C | 15 | 1 | 50 |
| D | 15 | 0 | 50 |
| E | 15 | 5 | 50 |
| F | 20 | 1 | 50 |
| G | 15 | 5 | 50 |
| H | 10 | 8 | 50 |

116

| AREA | ROUTING PATH COUNT | FAULT PATH COUNT | AREA FAULT THRESHOLD VALUE (%) |
|---|---|---|---|
| A | 200 | 4 | 50 |
| B | 100 | 70 | 50 |
| C | 15 | 1 | 50 |
| D | 150 | 30 | 50 |
| E | 100 | 10 | 50 |
| F | 25 | 1 | 50 |
| G | 50 | 10 | 50 |
| H | 80 | 65 | 50 |

AREA FAULT DETERMINATION TABLE

FIG. 16

AREA STATUS TABLE

| TIER (501) | AREA (502) | STATUS (503) | |
|---|---|---|---|
| 1 | A | NORMAL | 504 |
| | B | FAULT | 505 |
| | C | NORMAL | 506 |
| | D | NORMAL | 507 |
| | E | FAULT | 508 |
| | F | NORMAL | 509 |
| | G | NORMAL | 510 |
| | H | NORMAL | 511 |
| 2 | AD | NORMAL | 512 |
| | BE | FAULT | 513 |
| | CF | NORMAL | 514 |
| | GH | NORMAL | 515 |

FIG. 17

DETOUR PATH SEARCH TABLE

| TIER (521) | ROUTING EDGE NODE (BEFORE CHANGE) (522) | FAULT AREA (523) | SELECTION PRIORITY (524) | NORMAL AREA (525) | ROUTING EDGE NODE (AFTER CHANGE) (526) | |
|---|---|---|---|---|---|---|
| 1 | 2, 3, 4, 5 | Area B | 1 | A, E, C | 7, 15, 16, 10 | 527 |
| | 14, 8, 9, 17 | Area B | 1 | D, E, F | 19, 20, 21, 22 | 528 |
| 2 | 2, 3, 4, 5 | Area BE | 1 | AD, GH, CF | 11, 25, 26, 12 | 529 |
| | 14, 8, 9, 17 | Area BE | 1 | AD, GH, CF | 29, 31, 32, 30 | 530 |
| | | | 2 | AD, GH, CF | 23, 27, 28, 24 | 531 |

FIG. 18

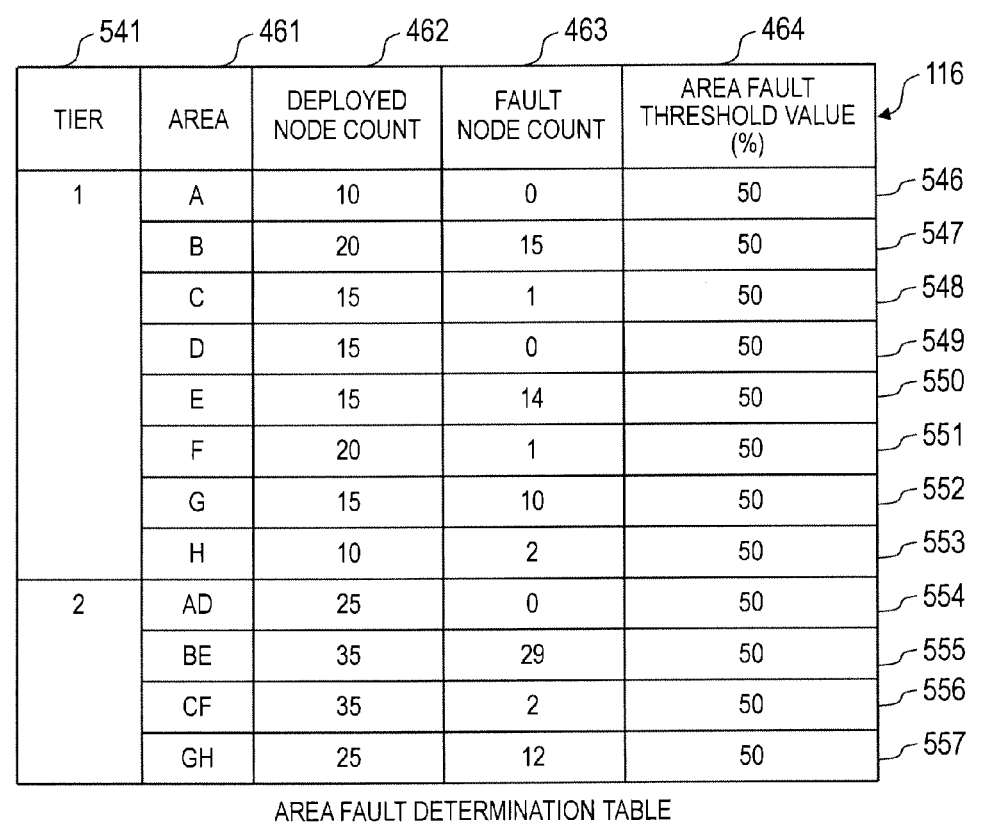

| TIER | AREA | DEPLOYED NODE COUNT | FAULT NODE COUNT | AREA FAULT THRESHOLD VALUE (%) | |
|---|---|---|---|---|---|
| 1 | A | 10 | 0 | 50 | 546 |
| | B | 20 | 15 | 50 | 547 |
| | C | 15 | 1 | 50 | 548 |
| | D | 15 | 0 | 50 | 549 |
| | E | 15 | 14 | 50 | 550 |
| | F | 20 | 1 | 50 | 551 |
| | G | 15 | 10 | 50 | 552 |
| | H | 10 | 2 | 50 | 553 |
| 2 | AD | 25 | 0 | 50 | 554 |
| | BE | 35 | 29 | 50 | 555 |
| | CF | 35 | 2 | 50 | 556 |
| | GH | 25 | 12 | 50 | 557 |

AREA FAULT DETERMINATION TABLE

FIG. 19

| TIER | AREA | ROUTING PATH COUNT | FAULT PATH COUNT | AREA FAULT THRESHOLD VALUE (%) | |
|---|---|---|---|---|---|
| 1 | A | 200 | 4 | 50 | 566 |
| | B | 100 | 70 | 50 | 567 |
| | C | 15 | 1 | 50 | 568 |
| | D | 150 | 30 | 50 | 569 |
| | E | 100 | 80 | 50 | 570 |
| | F | 25 | 1 | 50 | 571 |
| | G | 50 | 10 | 50 | 572 |
| | H | 80 | 15 | 50 | 573 |
| 2 | AD | 350 | 34 | 50 | 574 |
| | BE | 200 | 150 | 50 | 575 |
| | CF | 40 | 2 | 50 | 576 |
| | GH | 130 | 25 | 50 | 577 |

AREA FAULT DETERMINATION TABLE

COMMUNICATION SYSTEM, COMMUNICATION METHOD AND NETWORK MANAGEMENT APPARATUS

CLAIM OF PRIORITY

The present application claims priority from Japanese patent application JP2011-222683 filed on Oct. 7, 2011, the content of which is hereby incorporated by reference into this application.

BACKGROUND OF THE INVENTION

An amount of information distributed in an intranet has been increasing year by year, and importance of communication services for companies have been growing increasingly. In view of the above-mentioned situation, carriers provide companies as users with a bandwidth guarantee service for laying a communication network for coupling intra-company local area networks (LANs) arranged in a plurality of locations to one another and reserving a bandwidth for each company.

Examples thereof that are being introduced include a communication system to which a multi protocol label switching-transport profile (MPLS-TP) is applied. The MPLS-TP realizes a bandwidth guarantee by establishing an end-to-end path for which a bandwidth is reserved in advance.

With the growth in demand for communication services aimed at companies and the growth in necessity for reliable communications of important data, the bandwidth guarantee service is required to meet a demand for reliability of continuing important communications by switching a communication path even at an occurrence of a large-scale wide-area disaster. In addition, a large number of communications often break simultaneously on an occasion of the wide-area disaster, and there is a demand to reduce system load due to communication path switching processing in order to quickly recover the communications.

Therefore, there is proposed a technology in which, if a fault is detected within a network on an occasion of a disaster, it is examined whether or not communications are enabled (a ping is carried out) across a suspected peripheral segment (segment in which the fault is expected to have occurred but from which a notification such as an alarm has not been detected yet) based on network topology information, to thereby identify a fault segment, and the communications are recovered in order from the communication given a highest priority, to thereby continue the communication service (see, for example, Japanese Patent Application Laid-open No. 2008-061196).

In addition, there is proposed a technology in which a control device groups and manages femtocell base stations, and only if a ratio of the number of failed base stations to the number of base stations deployed in the group exceeds a threshold value defined in advance, notifies a network management apparatus, to thereby reduce notification processing load on the control device (see, for example, Japanese Patent Application Laid-open No. 2009-231861).

Further, as a search method for a detour path, there are proposed technologies in which a path calculating device manages intermediate areas and boundary nodes thereof from a transmitting end and a receiving end and calculates the path within each area (see, for example, Japanese Patent Application Laid-open No. 2009-060673). The path calculating devices disclosed in Japanese Patent Application Laid-open No. 2009-060673 calculate only the path within each area, to thereby enable a path search without collecting topology information on a whole network.

Further, the path calculating devices disclosed in Japanese Patent Application Laid-open No. 2009-060673 select an intermediate area in the path search and search for the path satisfying a condition within the intermediate area. When the path satisfying the condition is not found, another intermediate area is selected to search for the path satisfying the condition again. The path calculating devices repeat the above-mentioned processing until the path satisfying the condition is found.

In addition, there is proposed a technology in which a network device manages an area in which a redundant path formed by combining an active path and a standby path is set (see, for example, Japanese Patent Application Laid-open No. 2006-340058). The standby path is in an opened and communicable state in advance, and the network device switches the communication path to the standby path when a communication fault occurs in the active path. When detecting a fault both in the active path and in the standby path, the network device sets a detour path in an area different from the area for the redundant path.

SUMMARY OF THE INVENTION

The communication service provided by an MPLS-TP network provides a subject including a company as the user with a service for communicating the important data. For this reason, the reliability for reducing a service interruption time involving the communications of the important data and continuing the service reliably even if a fault occurs in communication infrastructures of the MPLS-TP network due to a wide-area disaster is required.

However, even if the standby path other than the active path is opened in advance to have the active path and the standby path in a communicable state, there is a problem in that the service cannot be continued by switching the active path to the standby path when faults occur simultaneously in the active path and the standby path on the occasion of the wide-area disaster.

In addition, the network management apparatus and the network device perform recovery processing for the service based on a detour path search for the communication path in which the fault has been detected and opening processing for the retrieved detour path. However, there is a problem of an increase in load on the network management apparatus for performing the recovery processing from a large number of communication path faults that occur simultaneously on the occasion of the wide-area disaster.

In the technologies disclosed in Japanese Patent Application Laid-open Nos. 2009-060673 and 2006-340058, a network is divided into areas formed of a plurality of network devices, and a routing area of the detour path is designated. However, in the technologies disclosed in Japanese Patent Application Laid-open Nos. 2009-060673 and 2006-340058, a fault area is not excluded from search targets for the detour path. For this reason, detour path search processing is performed with respect to the fault area, thereby spending an excess search time. As a result, there is a problem in that a service interruption involving the communications of the important data occurs during the excess search time. In addition, the network management apparatus searches for the detour path with respect to the fault area, which leads to a problem of an increase in processing load on the network management apparatus.

Further, in the technologies disclosed in Japanese Patent Application Laid-open Nos. 2009-060673 and 2006-340058, the network management apparatus does not manage information obtained by associating respective routing areas of the communication path with respective routing areas of the detour path, and hence a bias occurs in search targets when the network management apparatus searches for the detour path. As a result, a search failure due to an unsatisfied condition such as an insufficient bandwidth is repeated, which necessitates excess execution of selection of the routing area of the detour path. As a result, the network management apparatus executes the detour path search with respect to excess routing areas, which leads to a problem in that a service interruption involving the communications of the important data occurs during the search time. In addition, the network management apparatus searches for the detour path with respect to excess areas, which leads to a problem of raising the processing load on the network management apparatus.

Thus, an aspect of the invention is a communication system including a plurality of network devices, and a network management apparatus to be coupled to the plurality of network devices. The plurality of network devices are classified into a plurality of areas. Each of the plurality of areas includes an edge node, which is one of the plurality of network devices through which an active path passing through the each of the plurality of areas passes first in the each of the plurality of areas, and an edge node, which is one of the plurality of network devices through which the active path passes last in the each of the plurality of areas. The network management apparatus includes a processor, a memory and an interface. The network management apparatus retains, in the memory, fault information comprising values indicating the plurality of areas and values each indicating whether or not a fault has occurred in the each of the plurality of areas. The network management apparatus retains, in the memory, detour path information comprising values indicating a plurality of edge nodes through which the active path passes, values indicating areas through which the active path passes, values indicating alternative areas to the areas through which the active path passes, and priorities assigned to the alternative areas; determine whether or not the fault has occurred in the each of the plurality of areas based on the fault information; identify, in a case where it is determined that a fault has occurred in a first area, an alternative area to the first area based on the detour path information. The network management apparatus determines whether or not a fault has occurred in the identified alternative area to the first area based on the fault information. The network management apparatus determines, in a case where it is determined that the fault has not occurred in the identified alternative area to the first area, the identified alternative area to the first area as a second area through which the active path passes. The network management apparatus determines two edge nodes included in the second area based on the detour path information. The network management apparatus detects network devices through which the active path passes between the determined two edge nodes.

According to the exemplary embodiment of this invention, on an occasion of a wide-area disaster, the service interruption time involving important communications is reduced, and load on the control device for searching for the detour path is reduced.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 4 is an explanatory diagram illustrating an area status table according to the first embodiment of this invention.

FIG. 5 is an explanatory diagram illustrating a detour path search table according to the first embodiment of this invention.

FIG. 6 is an explanatory diagram illustrating a path priority table according to the first embodiment of this invention.

FIG. 7 is an explanatory diagram illustrating an area fault determination table for each area according to the first embodiment of this invention.

FIG. 16 is an explanatory diagram illustrating an area status table according to the second embodiment of this invention.

FIG. 17 is an explanatory diagram illustrating a detour path search table according to the second embodiment of this invention.

FIG. 18 is an explanatory diagram illustrating an area fault determination table for each area according to the second embodiment of this invention.

FIG. 19 is an explanatory diagram illustrating an area fault determination table for each active path according to the second embodiment of this invention.

DETAILED DESCRIPTION OF THE EMBODIMENTS

In embodiments of this invention, fault information is retained for each area including a plurality of nodes, and a search is performed for a detour path for each area, to thereby retrieve the detour path passing through an area in which no fault has occurred.

First Embodiment

A first embodiment of this invention is described below by referring to the accompanying drawings.

Figure 1:
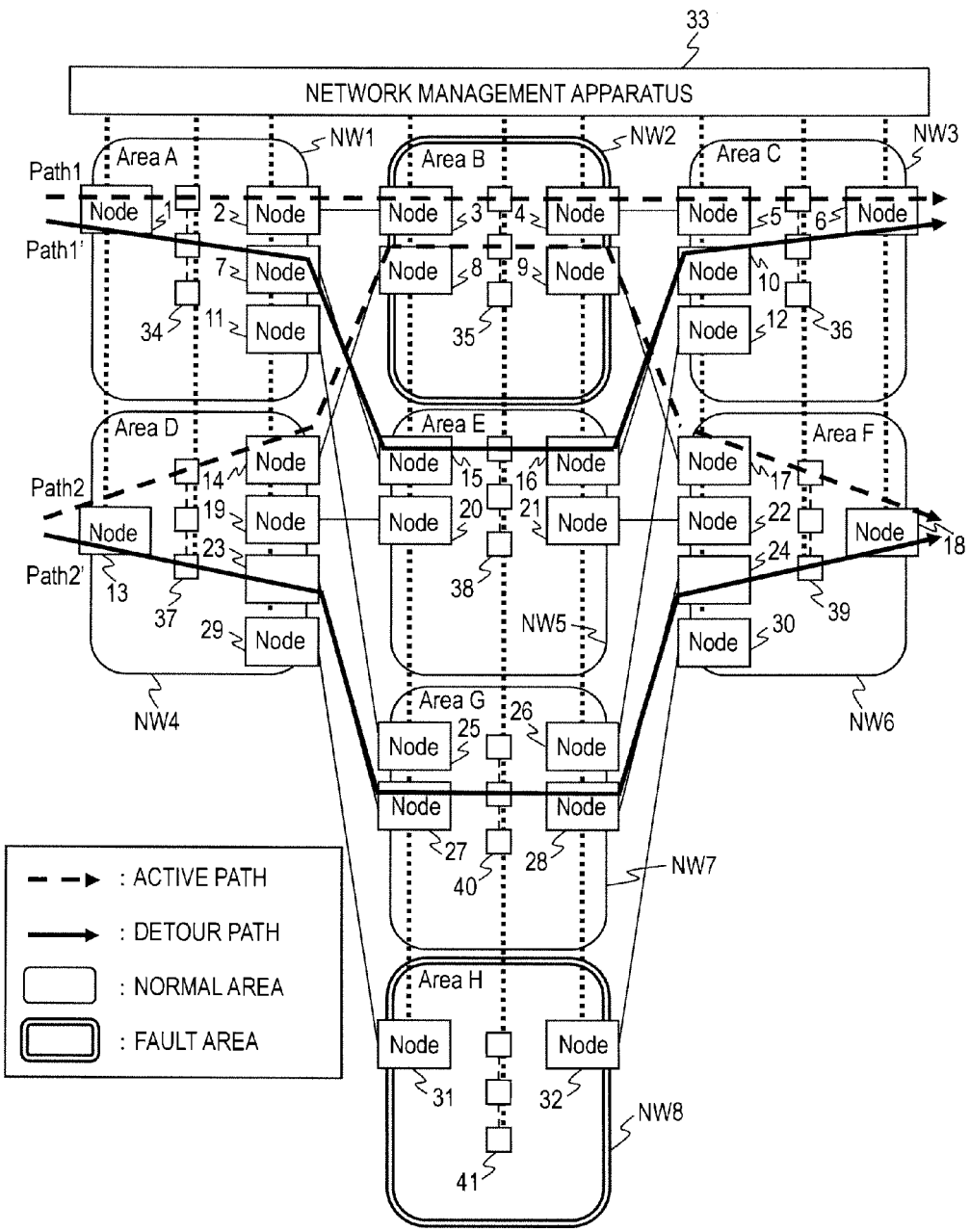
FIG. 1 is a block diagram illustrating a communication system according to a first embodiment of this invention.

FIG. 1 is a block diagram illustrating a communication system according to the first embodiment of this invention.

The communication system illustrated in FIG. 1 includes a bandwidth guarantee network and a network management apparatus 33. The bandwidth guarantee network includes a plurality of nodes 1 to 32 and node groups 34 to 41. Each of the nodes 1 to 32 is a network device (node). Each of the node groups 34 to 41 includes a plurality of network devices (nodes). The node according to this embodiment is a computer having functions such as a switch or a router.

An administrator of the bandwidth guarantee network manages the nodes 1 to 32 and the node groups 34 to 41 which are included in the bandwidth guarantee network by classifying the nodes 1 to 32 and the node groups 34 to 41 into a plurality of areas A to H (NW1 to NW8). Each of the areas A to H (NW1 to NW8) is a set defined as a set of nodes and physical links coupling between the nodes. The administrator of the bandwidth guarantee network classifies the nodes 1 to 32 and the node groups 34 to 41 by, for example, prefecture, region, state, or the like, and defines results of the classification as the areas A to H.

The nodes 1 to 32 are nodes arranged at edges, in other words, edge nodes, of the areas A to H. The nodes 1 to 32 are coupled to an edge node of another area.

Path1 and Path2 of FIG. 1 are paths for communication data of an end user. The path according to this embodiment passes through at least one of the areas A to H. Path1 and Path2 pass through the area B. Path1' and Path2' of FIG. 1 are detour paths for Path1 and Path2, respectively. A procedure for searching for Path1' and Path2' is described later by referring to FIG. 13.

The network management apparatus 33 is a computer for defining a path in the bandwidth guarantee network and monitoring a status of each of the nodes included in the bandwidth guarantee network. When detecting a fault that affects communications, the network management apparatus 33 searches for the detour path, and opens the detour path being a search result thereof. This enables the bandwidth guarantee network to continue providing a communication service to the end user even if a fault occurs.

In the first embodiment, when wide-area disasters occur in the area B and the area H, the network management apparatus 33 executes a detour path search described later.

It should be noted that the bandwidth guarantee network according to this embodiment may include any number of nodes and any number of node groups. Further, the administrator of the bandwidth guarantee network according to this embodiment may define any number of areas.

As described above, by classifying the nodes included in the bandwidth guarantee network by area, when a fault ascribable to a wide-area disaster occurs in the path through which data of the end user is flowing, the network management apparatus 33 can impose a limitation on target areas for searching for the detour path. As a result, it is possible to reduce processing load imposed on the network management apparatus 33 by the detour path search. In addition, a detour path search time is shortened, which can shorten a communication service interruption time.

Figure 2:
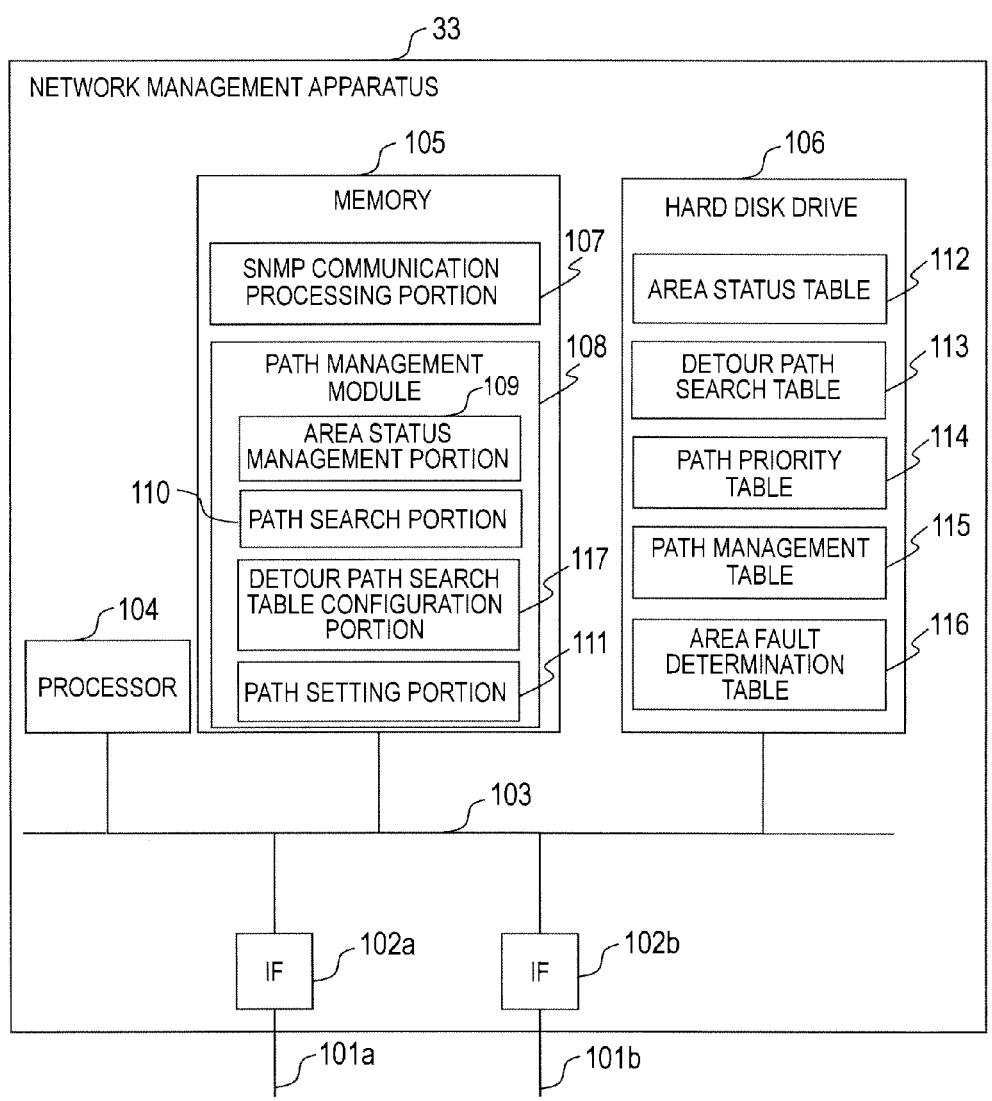
FIG. 2 is a block diagram illustrating a physical configuration and functions of a network management apparatus according to the first embodiment of this invention.

FIG. 2 is a block diagram illustrating a physical configuration and functions of the network management apparatus 33 according to the first embodiment of this invention.

The network management apparatus 33 includes lines 101 (101a and 101b), interface units (IFs) 102 (102a and 102b), a bus 103, a processor 104, a memory 105, and a hard disk drive 106. The respective components included in the network management apparatus 33 are coupled to one another by the bus 103.

The lines 101 (101a and 101b) are coupled to the nodes 1 to 32 and the node groups 34 to 41 which are included in the bandwidth guarantee network. The interface units (IFs) 102 (102a and 102b) receive the lines 101 (101a and 101b).

The processor 104 is a processor such as, for example, a CPU. The memory 105 is a storage area for temporarily retaining data or programs. The hard disk drive 106 is a storage area for retaining data or programs. The functions of the network management apparatus 33 are implemented by the processor 104 executing the programs retained in the memory 105.

Stored in the memory 105 are an SNMP communication processing portion 107 being a program for performing simple network management protocol (SNMP) communication processing and a path management portion 108 being a program for managing paths.

The SNMP communication processing portion 107 has a function of transmitting or receiving an SNMP message to or from the nodes 1 to 32 and the node groups 34 to 41 which form the bandwidth guarantee network.

The path management portion 108 includes a path setting portion 111, an area status management portion 109, a path search portion 110, and a detour path search table configuration portion 117. The path setting portion 111 is a program for setting a path in the bandwidth guarantee network. The area status management portion 109 is a program for managing fault statuses of the areas A to H (NW1 to NW8).

The path search portion 110 is a program for searching for a path that can be set within the bandwidth guarantee network. The detour path search table configuration portion 117 is a program for setting a condition used in a case where the network management apparatus 33 searches for the detour path at an occurrence of the fault within the bandwidth guarantee network.

The hard disk drive 106 includes an area status table 112, a detour path search table 113, a path priority table 114, a path management table 115, and an area fault determination table 116.

The area status table 112 retains information indicating the fault statuses of the areas A to H (NW1 to NW8).

The detour path search table 113 retains information on routing nodes as the condition used in the case where the network management apparatus 33 searches for the detour path at the occurrence of the fault within the bandwidth guarantee network. The path priority table 114 retains priority information given to each path within the bandwidth guarantee network.

The path management table 115 retains set bandwidth information and topology information on the path opened within the bandwidth guarantee network by the path setting portion 111 of the network management apparatus 33. The area fault determination table 116 retains fault determination threshold value information and a node count or a routing path count within the areas A to H (NW1 to NW8) as a condition for determining whether or not there is a fault in the areas A to H (NW1 to NW8).

It should be noted that the network management apparatus 33 may be coupled to an input/output interface 901 for allowing the administrator to input set values and data for the respective processing portions. The input/output interface 901 is a device such as a mouse, a keyboard, or a display.

Figure 3:
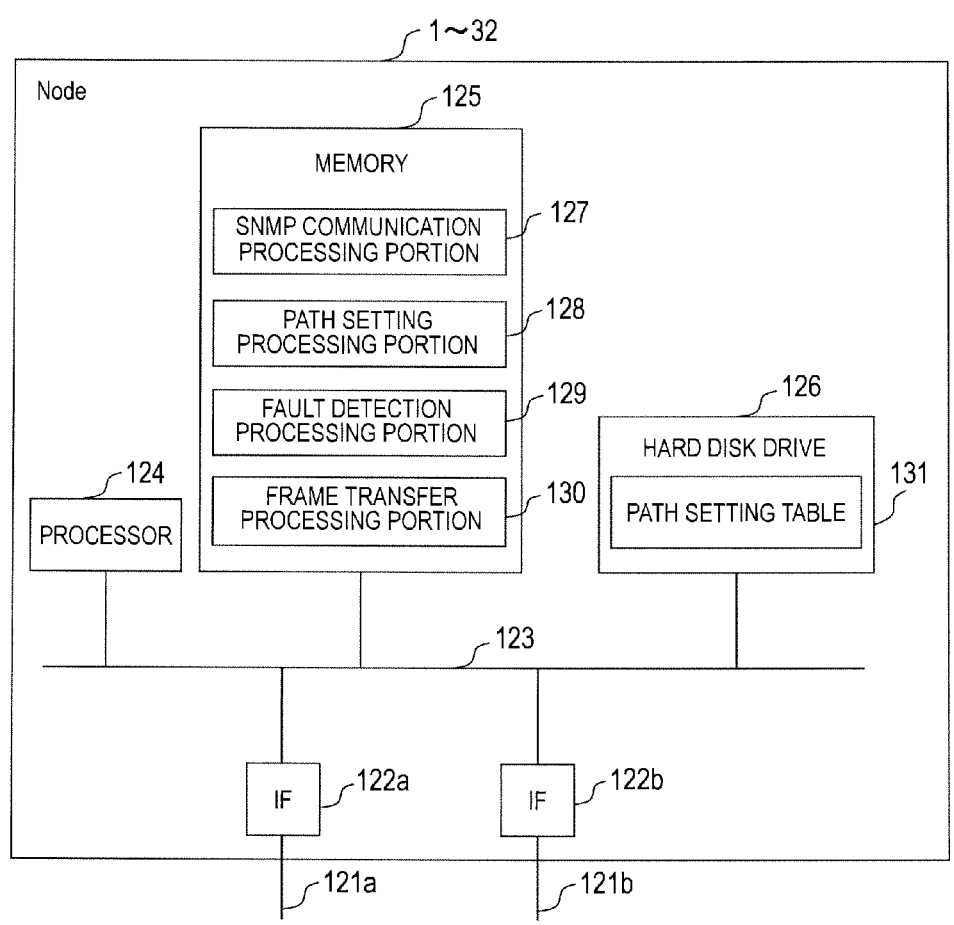
FIG. 3 is a block diagram illustrating a physical configuration and functions of a node according to the first embodiment of this invention.

FIG. 3 is a block diagram illustrating a physical configuration and functions of the node according to the first embodiment of this invention.

The node illustrated in FIG. 3 is a node included in the nodes 1 to 32 and the node groups 34 to 41. The node includes lines 121 (121a and 121b), interface units (IFs) 122 (122a and 122b), a bus 123, a processor 124, a memory 125, and a hard disk drive 126. The respective components included in the node are coupled to one another by the bus 123.

The lines 121 (121a and 121b) are coupled to the respective nodes of the bandwidth guarantee network. The interface units (IFs) 122 (122a and 122b) receive the lines 121 (121a, 121b).

The processor 124 is a processor such as, for example, a CPU. The memory 125 is a storage area for temporarily retaining data or programs. The hard disk drive 126 is a storage area for retaining data or programs. The functions of the node are implemented by the processor 124 executing the programs retained in the memory 125.

The hard disk drive 126 retains a path setting table 131 being information on the path defined by a path setting processing portion 128. The path setting table 131 retains information obtained by associating an identifier of a path, a reception physical port number, a transmission physical port number, and a set bandwidth with one another.

Stored in the memory 125 are an SNMP communication processing portion 127, the path setting processing portion 128, a fault detection processing portion 129, and a frame transfer processing portion 130.

The SNMP communication processing portion 127 is a program for performing the SNMP communication processing. The SNMP communication processing portion 127 has a function of transmitting or receiving an SNMP message to or from the network management apparatus 33.

The path setting processing portion 128 is a program for opening the path. The path setting processing portion 128 has a function of opening the path based on a route designated by the network management apparatus 33 and updating the path setting table 131.

The fault detection processing portion 129 is a program for detecting the fault. The fault detection processing portion 129 has a function of detecting a fault in a package card included in the node, a fault in a physical port, and a fault in the node itself.

In addition, the fault detection processing portion 129 has a path fault detection function based on an operation administration and maintenance (OAM) function such as, for example, a function of detecting a path fault at an occurrence of a communication interruption on the path by transmitting/receiving a frame for periodically confirming a coupled status on the path. In addition, the fault detection processing portion 129 has a function of notifying the network management apparatus 33 of the fault information when the fault is detected.

The frame transfer processing portion 130 is a program for transferring the frame. The frame transfer processing portion 130 has a function of transmitting/receiving the frame based on the information on the path set by the path setting processing portion 128.

The node includes the fault detection processing portion 129, to thereby enable the network management apparatus 33 to receive a fault notification from the node and monitor the fault status within the bandwidth guarantee network. Further, by including the path setting processing portion 128, the node can store, in the path setting table 131, information on the detour path selected as a result of a search performed by the network management apparatus 33.

It should be noted that, in the network management apparatus 33 and the nodes according to this embodiment, the respective processing portions are implemented by the programs in FIG. 2 and FIG. 3, but may be implemented by hardware. Further, the respective processing portions may be implemented by one program or one piece of hardware, while the respective processing portions may be implemented by a plurality of programs or a plurality of pieces of hardware on a processing-to-processing basis.

FIG. 4 is an explanatory diagram illustrating the area status table 112 according to the first embodiment of this invention.

The area status table 112 shows the fault statuses of the areas A to H (NW1 to NW8). The area status table 112 includes an area 401 and a status 402. The area 401 indicates the area included in the bandwidth guarantee network according to this embodiment. The status 402 indicates "fault" when a fault has occurred in each area.

The area status table 112 illustrated in FIG. 4 includes entries 403 to 410, and shows the fault statuses of the areas A to H. Further, the area status table 112 shows a case where the network management apparatus 33 has determined that the area B (NW2) and the area H (NW8) are in a fault status and that the other areas (areas A (NW1), C (NW3), D (NW4), E (NW5), F (NW6), and G (NW7)) are in a normal status.

The area status table 112 stores the fault status for each area 401, to thereby enable the network management apparatus 33 to appropriately select the search target for the detour path based on the fault status of the area indicated by the area 401. Accordingly, it is possible to reduce detour path search processing load on the network management apparatus 33. In addition, the detour path search time is reduced, which can reduce a service interruption time after the path fault occurs until the network management apparatus 33 opens the detour path.

FIG. 5 is an explanatory diagram illustrating the detour path search table 113 according to the first embodiment of this invention.

The detour path search table 113 shows which area is to be the detour path instead of the area determined to be in a fault status. The detour path search table 113 includes a routing edge node (before change) 421, a fault area 422, a selection priority 423, a normal area 424, and a routing edge node (after change) 425. The detour path search table 113 illustrated in FIG. 5 includes entries 426 to 430.

The routing edge node (before change) 421 indicate a combination of routing edge nodes on the path (hereinafter referred to as "active path") used by the user for communications before the detour path is opened. The routing edge node (before change) 421 indicates four nodes among the nodes 1 to 32, and indicates the edge nodes through which the active path passes in order to pass through three areas.

The fault area 422 indicates the second area through which the active path passes among the three areas including the edge nodes indicated by the routing edge node (before change) 421. The entry including the area determined to be in a fault status in the fault area 422 indicates the detour path for the area determined to be in a fault status.

The selection priority 423 indicates a place in an order in which a set of the areas indicated by the normal area 424 is retrieved as the detour path. As the value of the selection priority 423 according to this embodiment becomes smaller, the priority becomes higher, in other words, the selection priority 423 indicates that the set of the areas is retrieved as the detour path more preferentially as the value becomes smaller.

The normal area 424 indicates the areas premised on the occurrence of no fault therein when the network management apparatus 33 searches for the detour path.

The routing edge node (after change) 425 indicates a combination of the routing edge nodes through which the active path passes after the detour path is opened. The routing edge node (after change) 425 indicates four nodes among the nodes 1 to 32 in the same manner as the routing edge node (before change) 421.

The detour path search table 113 retains the normal area 424, thereby enabling the network management apparatus 33 to exclude the area determined to be in a fault status from the search targets for the detour path. Accordingly, it is possible to reduce the detour path search processing load on the network management apparatus 33. In addition, a detour path search processing time can be reduced, which can reduce the service interruption time after the fault in the active path occurs until the opening of the detour path.

In addition, the detour path search table 113 retains the selection priority 423, thereby enabling the target areas for searching for the detour path to be evenly assigned to a plurality of active paths. Accordingly, the detour paths opened by the network management apparatus 33 are evenly assigned to a plurality of areas, which can avoid concentration of a communication bandwidth on a specific area. As a result, it is possible to reduce the occurrence of a case where the opening becomes impossible due to the insufficient bandwidth when the network management apparatus 33 searches for the detour path and a search is performed for another area again. Accordingly, it is possible to reduce the detour path search processing load on the network management apparatus 33, and it is also possible to shorten the service interruption time after the fault occurs in the active path until the network management apparatus 33 opens the detour path as the active path.

FIG. 6 is an explanatory diagram illustrating the path priority table 114 according to the first embodiment of this invention.

The path priority table 114 indicates a place in an order in which the detour path is selected on an occasion of the fault. The path priority table 114 includes a path ID 441 and a priority 442. The path priority table 114 illustrated in FIG. 6 includes entries 443 and 444.

The path ID 441 indicates an identifier for uniquely identifying the active path. The priority 442 indicates that, as the value indicated by the priority 442 becomes larger, the active path indicated by the path ID 441 has a higher priority and the detour path therefor is more preferentially selected. For example, in a case of the path of an MPLS-TP, the path priority table 114 may retain a value ranging from 0 to 7 set in a traffic class (TC) field as the priority 442.

The path priority table 114 retains the priority 442 of the active path indicated by the path ID 441, thereby enabling the network management apparatus 33 to recover the service by referring to the path priority table 114 to open the detour paths for the active paths in order from the highest priority even if faults simultaneously occur in the plurality of active paths due to the wide-area disaster. Accordingly, it is possible to reduce the service interruption time involving a high-priority path.

Further, the network management apparatus 33 can continue the service by preferentially opening the detour path for the high-priority active path even if a bandwidth resource within the bandwidth guarantee network is insufficient.

FIG. 7 is an explanatory diagram illustrating the area fault determination table 116 for each area according to the first embodiment of this invention.

The area fault determination table 116 includes an area 461, a deployed node count 462, a fault node count 463, and an area fault threshold value 464. The area fault determination table 116 illustrated in FIG. 7 includes entries 453 to 460.

The area 461 indicates the area included in the bandwidth guarantee network. The deployed node count 462 indicates a total count of the nodes included in each area. The fault node count 463 indicates the number of nodes in which a fault has been detected among the nodes included in each area.

The area fault threshold value 464 represents a ratio of the fault node count 463 to the deployed node count 462 based on which it is determined that a fault has occurred in each area. A value defined by the administrator in advance is stored as the area fault threshold value 464.

When detecting, from each node, the communication interruption between the network management apparatus 33 and each node, an alarm issued from the node, a package card fault exhibiting a value equal to or larger than a predefined threshold value (for example, 50%), a physical port fault exhibiting a value equal to or larger than a predefined threshold value (for example, 50%), or the like, the network management apparatus 33 determines, as a fault node, the node from which the fault or the like has been detected, and calculates the fault node count 463 for each area.

It should be noted that the network management apparatus 33 previously retains information indicating which node is classified into the area included in the bandwidth guarantee network.

When the ratio calculated by dividing the fault node count 463 by the deployed node count 462 exceeds the area fault threshold value 464, the network management apparatus 33 determines the area 461 as a fault area in which the fault has occurred. The entries 454 and 460 illustrated in FIG. 7 indicate that the ratio of the fault node count 463 to the deployed node count 462 exceeds the area fault threshold value 464, and hence the network management apparatus 33 determines that the area B (NW2) and the area H (NW8) are fault areas.

The area fault determination table 116 retains the deployed node count 462, the fault node count 463, and the area fault threshold value 464 for each area 461, thereby enabling the network management apparatus 33 to determine the fault area based on the fault in the node for each area.

The network management apparatus 33 may randomly extract the nodes to be monitored for each area 461 in advance, and generate the area fault determination table 116 regarding only the extracted nodes. Accordingly, it is possible to reduce area fault determination processing load on the network management apparatus 33.

Figures 8, 9:
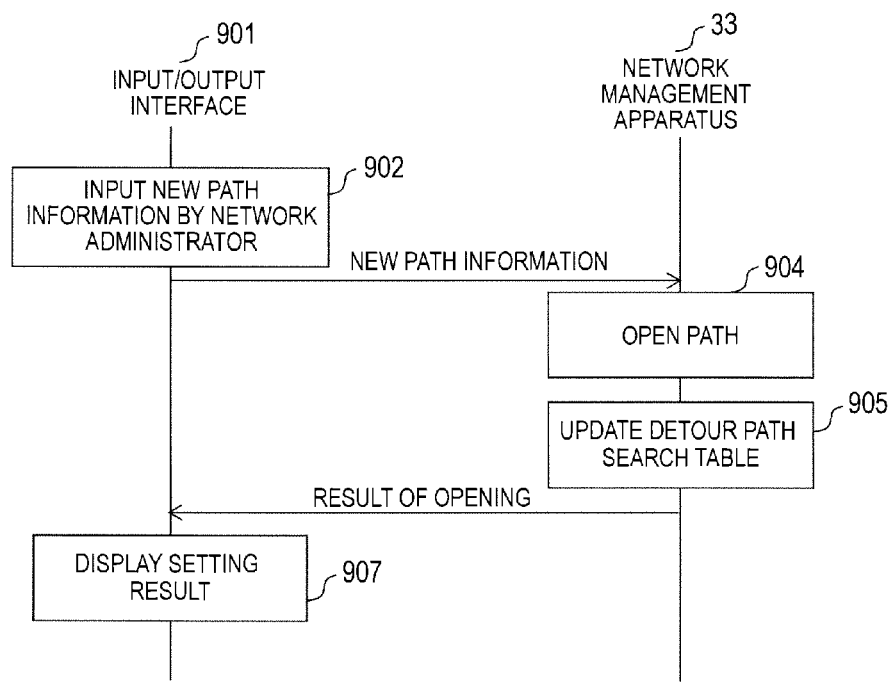
FIG. 8 is an explanatory diagram illustrating an area fault determination table for each active path according to the first embodiment of this invention.
FIG. 9 is a sequence diagram illustrating a procedure for updating the detour path search table according to the first embodiment of this invention.

FIG. 8 is an explanatory diagram illustrating the area fault determination table 116 for each active path according to the first embodiment of this invention.

The area fault determination table 116 includes an area 481, a routing path count 482, a fault path count 483, and an area fault threshold value 484. The area fault determination table 116 illustrated in FIG. 8 includes entries 473 to 480.

The area 481 indicates the area included in the bandwidth guarantee network. The routing path count 482 indicates a total count of the active paths passing through each area. The fault path count 483 indicates the number of active paths in which a fault has been detected among the active paths passing through each area.

The area fault threshold value 484 represents a ratio of the fault path count 483 to the routing path count 482 based on which it is determined that a fault has occurred in each area.

A value defined by the administrator in advance is stored as the area fault threshold value 484.

The network management apparatus 33 determines, as a fault path, the active path for which an OAM alarm has been detected. For example, in a case where the bandwidth guarantee network according to this embodiment is an MPLS-TP network, the active path for which one of a loss of continuity (LOC), an alarm indication signal (AIS), and a link down indication (LDI), which are specified by an MPLS-TP OAM, has been detected is determined as the fault path.

It should be noted that the network management apparatus 33 previously retains information indicating the areas and the nodes through which all the active paths passing through the bandwidth guarantee network pass.

Further, in the case where the bandwidth guarantee network according to this embodiment is the MPLS-TP network, the bandwidth guarantee network according to this embodiment can include, as the active paths, a label switched path (LSP) and a plurality of pseudo wires (PWs) received by the LSP. However, in this case, only the LSP is to be managed by the area fault determination table 116, and a fault PW count or a routing PW count for each area is not to be managed by the area fault determination table 116. Accordingly, it is possible to reduce area fault management processing load on the network management apparatus 33.

If the ratio calculated by dividing the fault path count 483 by the routing path count 482 exceeds the area fault threshold value 484, the network management apparatus 33 determines the area 481 as the fault area in which the fault has occurred. The entries 474 and 480 illustrated in FIG. 8 indicate that the ratio of the fault path count 483 to the routing path count 482 exceeds the area fault threshold value 484, and hence the network management apparatus 33 determines that the area B (NW2) and the area H (NW8) are the fault areas.

The area fault determination table 116 retains the routing path count 482, the fault path count 483, and the area fault threshold value 484 for each area 481, thereby enabling the network management apparatus 33 to determine an area fault based on a path communication fault for each area.

The network management apparatus 33 may randomly extract the active paths to be monitored for each area 481 in advance, and generate the area fault determination table 116 regarding only the extracted active paths. Accordingly, it is possible to reduce the area fault determination processing load on the network management apparatus 33.

Further, the network management apparatus 33 may retain only one of or both of the area fault determination table 116 storing the deployed node count 462 and the fault node count 463 illustrated in FIG. 7 and the area fault determination table 116 storing the routing path count 482 and the fault path count 483 illustrated in FIG. 8. In the case of retaining the area fault determination table 116 illustrated in FIG. 7 and the area fault determination table 116 illustrated in FIG. 8, the network management apparatus 33 may determine the area fault by using an OR condition or an AND condition.

The network management apparatus 33 manages the area status table 112, the detour path search table 113, and the area fault determination table 116, thereby enabling the network management apparatus 33 to preferentially search appropriate areas for the detour path for the active path that has become inoperable due to the fault ascribable to the wide-area disaster, based on the fault statuses of the areas A to H (NW1 to NW8). Accordingly, it is possible to reduce the processing load imposed on the network management apparatus 33 by the detour path search. In addition, the detour path search time is shortened, which can shorten the communication service interruption time.

In addition, the network management apparatus 33 manages the path priority table 114, thereby enabling the opening of the detour path for the active path in order from the highest priority 442 when the faults occur simultaneously in the plurality of active paths on the occasion of the wide-area disaster. This results in the reduction of the service interruption time after the fault occurs in the high-priority active path until the detour path therefor is opened. Further, even when the bandwidth resource within the bandwidth guarantee network is insufficient, it is possible to continue the important service by preferentially opening the detour path for the high-priority active path.

Referring to a sequence illustrated in FIG. 9, a description is made of a procedure for opening a path by the network management apparatus 33 and a procedure for updating the detour path search table 113 thereby, which are followed in a case where the administrator of the bandwidth guarantee network according to this embodiment sets a new active path.

FIG. 9 is a sequence diagram illustrating the procedure for updating the detour path search table 113 according to the first embodiment of this invention.

The administrator of the bandwidth guarantee network uses the input/output interface 901 such as a mouse, a keyboard, or a display to input new path information to the network management apparatus 33 (902). The input new path information includes at least information indicating identifiers of endpoint nodes through which the new active path passes first and last in the bandwidth guarantee network, a bandwidth of the new active path, and a priority of the new active path.

After the new path information is input, the path setting portion 111 of the network management apparatus 33 sends a path opening instruction to all the nodes through which the new active path passes based on the input new path information, and opens the new active path (904). In addition, the detour path search table configuration portion 117 of the network management apparatus 33 adds an entry indicating the new active path to the detour path search table 113 (905).

Figure 10:
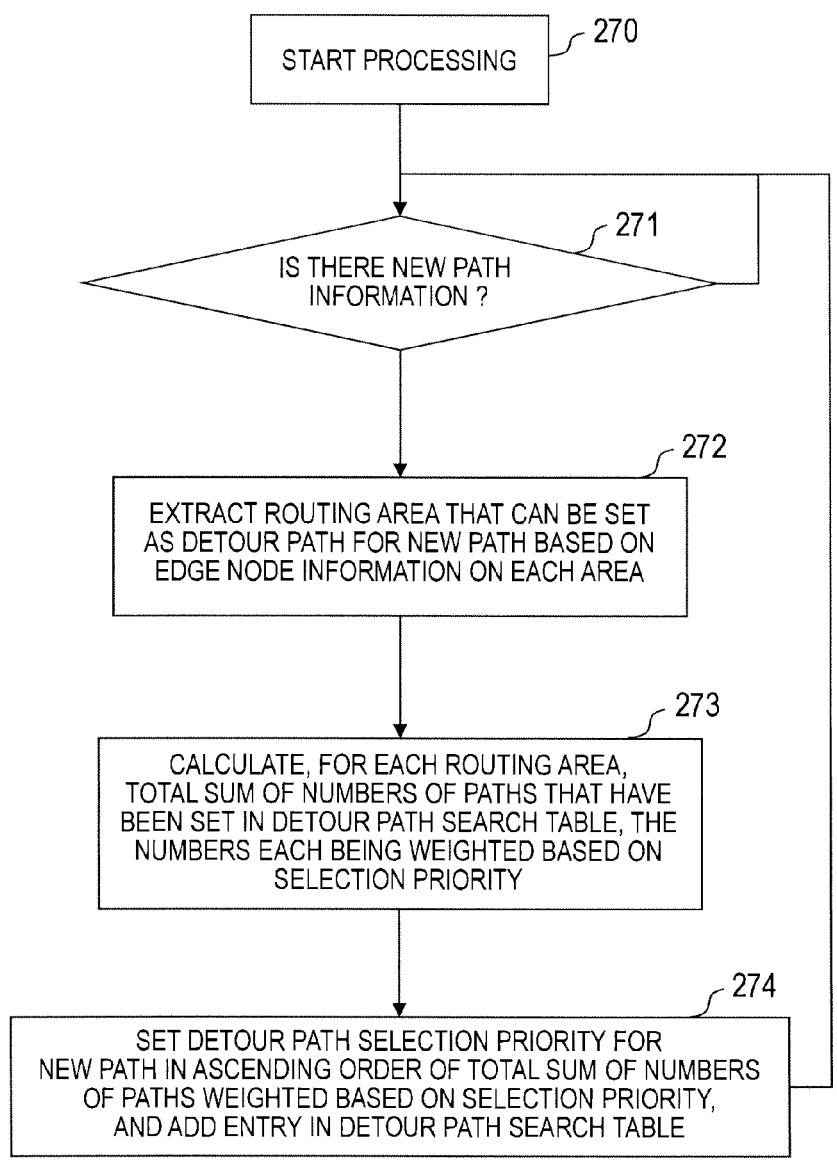
FIG. 10 is a flowchart illustrating a procedure for updating the detour path search table according to the first embodiment of this invention.

The processing of the detour path search table configuration portion 117 in Sequence 905 is illustrated in FIG. 10.

FIG. 10 is a flowchart illustrating a procedure for updating the detour path search table 113 according to the first embodiment of this invention.

After the processing is started (270) as illustrated in FIG. 10, the detour path search table configuration portion 117 stands by for the opening of the new active path (271). When the new active path is opened, the detour path search table configuration portion 117 extracts the area (routing area) that can be set as the detour path based on the nodes through which the new active path passes and edge node information on the areas A to H (NW1 to NW8) (272).

It should be noted that the network management apparatus 33 previously retains the edge node information indicating the area including the nodes 1 to 32. The edge node information includes information indicating which of the nodes 1 to 32 is coupled to which of the nodes 1 to 32. In other words, the edge node information represents the topology information on the respective areas.

Further, in Step 272, the detour path search table configuration portion 117 generates a new entry of the detour path search table 113 for storing information relating to the new active path. Then, values are stored into the routing edge node (before change) 421 and the fault area 422 of the new entry of the detour path search table 113 based on the information on the nodes through which the new active path opened in Step 271 passes, and further based on the routing area extracted in Step 272, values are stored into the normal area 424 and the routing edge node (after change) 425 of the new entry.

After Step 272, the detour path search table configuration portion 117 refers to the detour path search table 113 to weight, for each routing area extracted in Step 272, the numbers of paths (in other words, routing paths) that have been set in the detour path search table 113 and pass through the extracted routing area, each by the inverse of the corresponding selection priority 423, and then to calculate a total sum of the weighted numbers of routing paths (273).

For example, in Step 272, the area E, the area G, and the area H are extracted as the routing areas, and in the case where the detour path search table 113 is the detour path search table 113 illustrated in FIG. 5, the detour path search table configuration portion 117 refers to the entries 426 and 430 to calculate 1×(1/1)+1×(1/3)=(4/3) as the total sum of the selection priority for the area E.

Further, the detour path search table configuration portion 117 refers to the entries 427 and 429 to calculate 1×(1/2)+1×(1/2)=1 as the total sum of the selection priority for the area G. Further, the detour path search table configuration portion 117 refers to an entry 428 to calculate 1×(1/1)=1 as the total sum of the selection priority for the area H.

The detour path search table configuration portion 117 defines the routing path as the detour path for the new active path in ascending order of the total sum of the selection priority, which is obtained by weighting the numbers of paths by the inverse of the selection priority 423. In other words, the smallest value (in this embodiment, 1) is stored as the selection priority 423 of the new entry including the routing path having the smallest total sum of the selection priority as the normal area 424. Then, the generated new entry is added in the detour path search table 113 (274).

It should be noted that, in Step 273, the detour path search table configuration portion 117 may use not only the selection priority 423 but also the bandwidth of the path to perform the weighting.

According to the above-mentioned processing, a higher priority for the detour path search is set for the area having the smaller total sum of the numbers of routing paths weighted based on the selection priority. For this reason, the detour path search table configuration portion 117 can set the detour path so that the target areas for searching the detour path are evenly distributed. This can avoid the insufficient bandwidth due to the concentration of the opened detour paths on a specific area, and can reduce such repetitive processing that a search fails due to the insufficient bandwidth and is followed by another search performed on another area. As a result, it is possible to reduce search processing load on the network management apparatus 33, and it is also possible to shorten the service interruption time by reducing a time required for the search.

Returning to FIG. 9, after updating the detour path search table 113 in Sequence 905, the network management apparatus 33 displays a result of opening a new path and a result of updating the detour path search table 113 on the input/output interface 901 (907).

Figure 11:
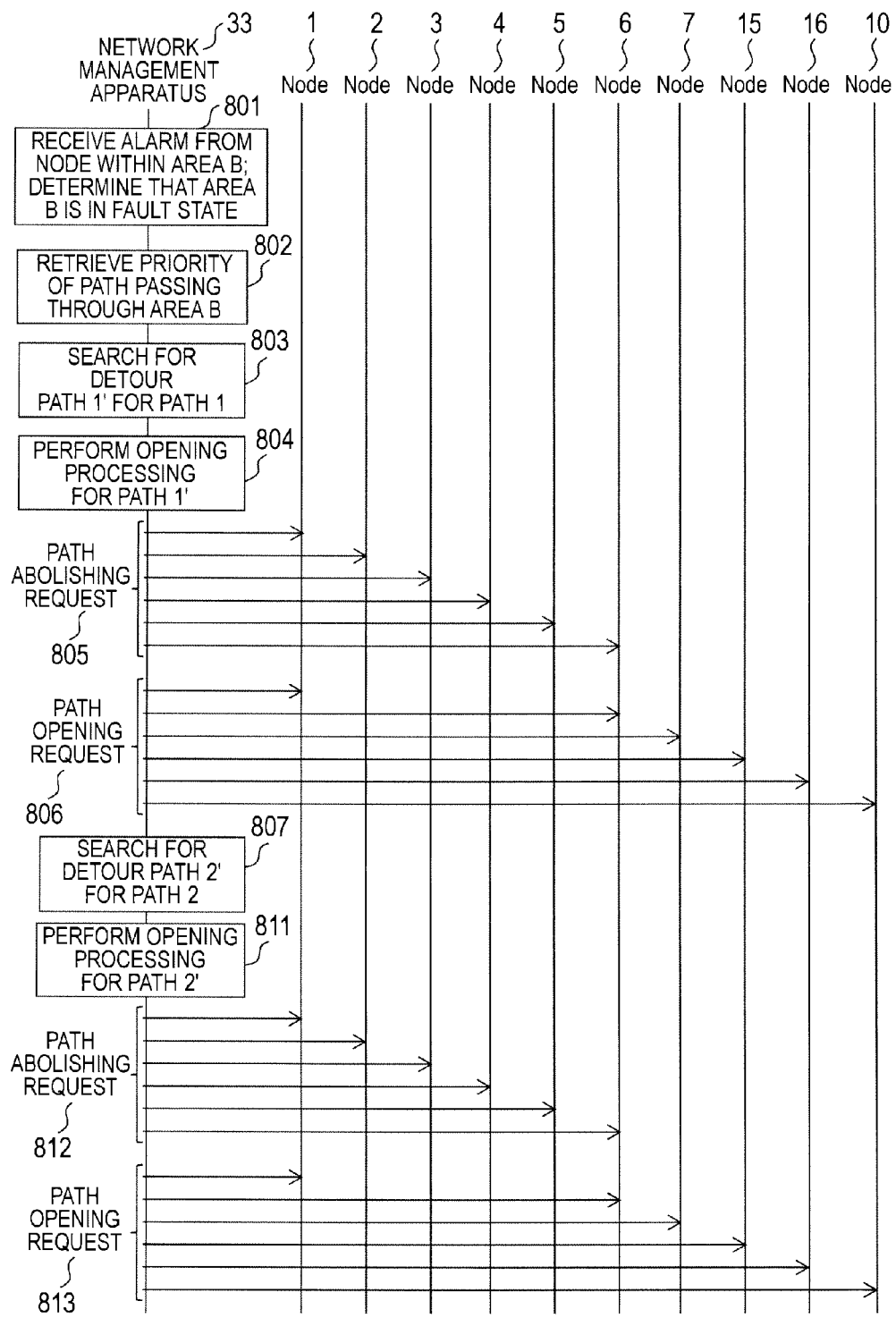
FIG. 11 is a sequence diagram illustrating a procedure for continuing a service by opening a detour path in a case where a wide-area disaster has occurred according to the first embodiment of this invention.

FIG. 11 is a sequence diagram illustrating a procedure for continuing the service by opening the detour path in the case where the wide-area disaster has occurred according to the first embodiment of this invention.

FIG. 11 illustrates a procedure for continuing the service by setting the detour path in the case where the wide-area disaster has occurred in the area B (NW2).

When the wide-area disaster occurs in the area B (NW2), the fault detection processing portion 129 of the node deployed in the area B detects the fault, and notifies the network management apparatus 33 of an alarm. When the network management apparatus 33 receives the alarm from the node, the area status management portion 109 executes the respective steps of processing illustrated in FIG. 12.

Figure 12:
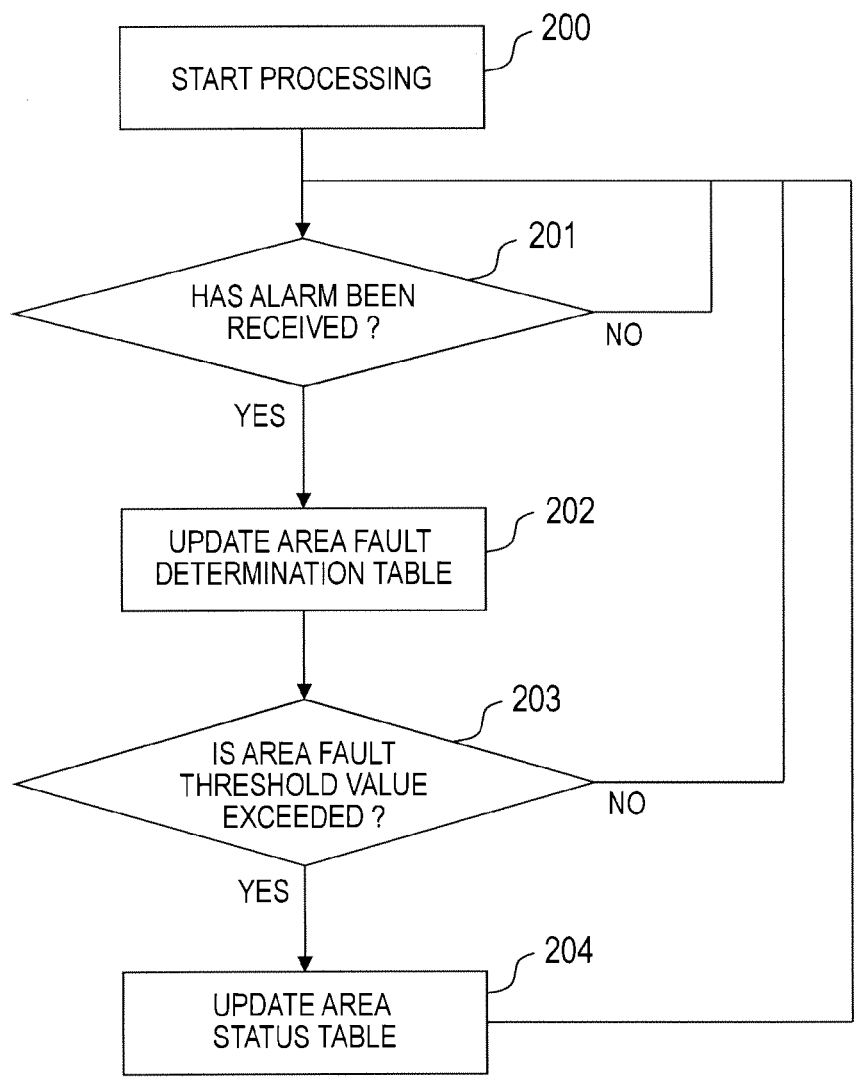
FIG. 12 is a flowchart illustrating fault determination processing for an area according to the first embodiment of this invention.

FIG. 12 is a flowchart illustrating fault determination processing for an area according to the first embodiment of this invention.

The processing illustrated in FIG. 12 corresponds to Sequence 801 illustrated in FIG. 11.

After the processing is started (200) as illustrated in FIG. 12, the area status management portion 109 stands by for the reception of the alarm from the node (201). When receiving the alarm from the node, the network management apparatus 33 updates the value of the fault node count 463 or the fault path count 483 of the area fault determination table 116 (202).

After Step 202, the area status management portion 109 refers to the area fault determination table 116 to determine whether or not the ratio of the fault node count 463 to the deployed node count 462 or the ratio of the fault path count 483 to the routing path count 482 exceeds the area fault threshold value 464 or 484 (203). When the ratio does not exceed the area fault threshold value 464 or 484, the area status management portion 109 stands by for the reception of the alarm (201) again.

When the ratio exceeds the area fault threshold value 464 or 484, the area status management portion 109 determines that the area whose ratio exceeds the area fault threshold value 464 or 484 as the fault area, and updates the status 402 of the area status table 112 from "normal" to "fault" (204). After that, the area status management portion 109 stands by for the reception of the alarm again (201).

When the area status management portion 109 of the network management apparatus 33 receives the alarm from the node, the area status management portion 109 updates the area fault determination table 116 and updates the area status table 112 based on the area fault threshold value 464 or 484. This enables the network management apparatus 33 to manage the fault statuses of the respective areas NW1 to NW8.

Returning to FIG. 11, when the alarm is received from the node within the area B and the network management apparatus 33 determines the area B (NW2) as the fault (801) by the processing of the area status management portion 109, the path search portion 110 of the network management apparatus 33 extracts the priority 442 of the active path passing through the area B (NW2) based on the path priority table 114 (802). Then, the path search portion 110 searches for and opens the detour paths in descending order of the priority 442 (803 to 813). Respective processing steps of the path search portion 110 are illustrated in FIG. 13.

Figure 13:
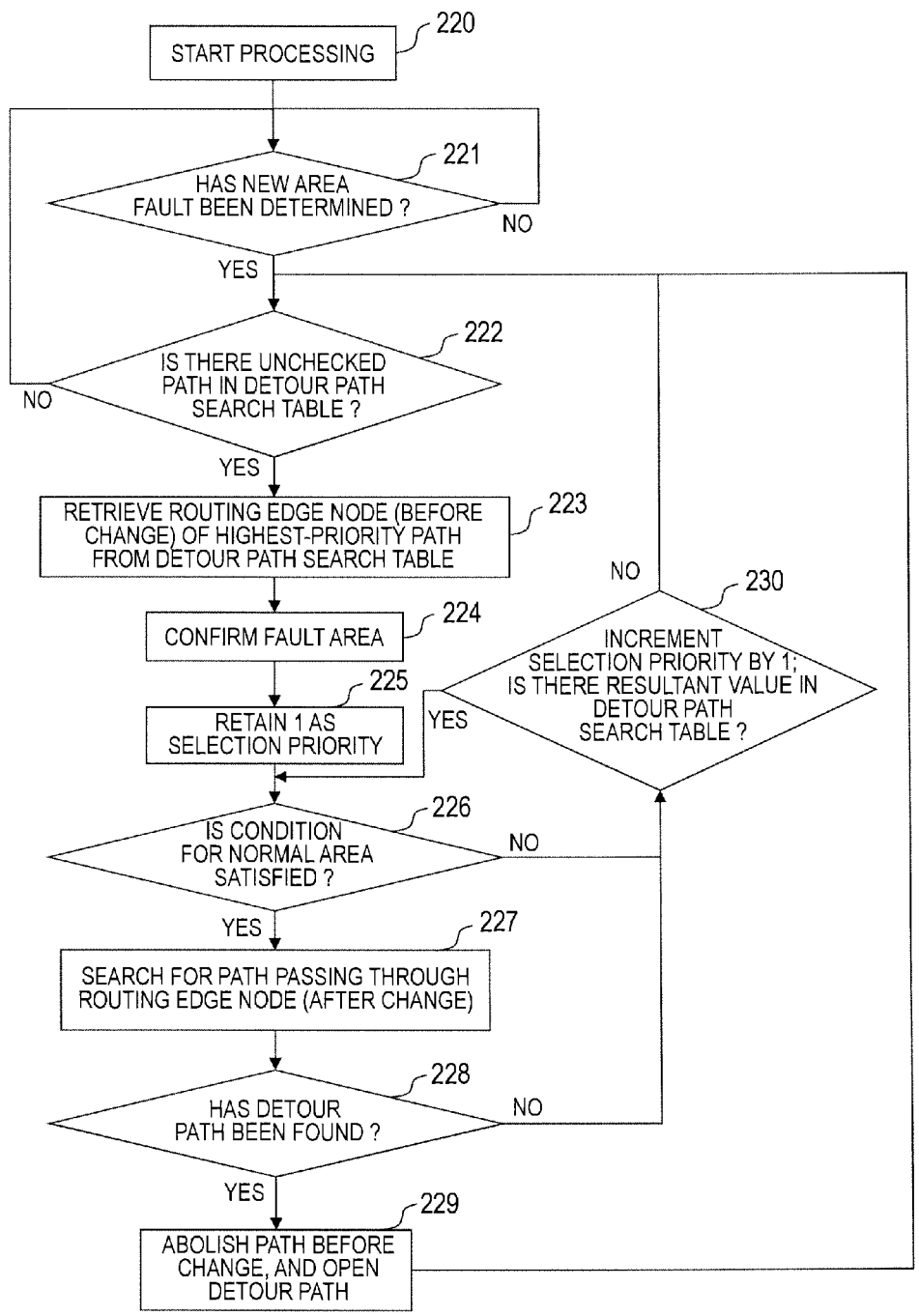
FIG. 13 is a flowchart illustrating search processing and opening processing for a detour path according to the first embodiment of this invention.

FIG. 13 is a flowchart illustrating search processing and opening processing for a detour path according to the first embodiment of this invention.

After the processing is started (220) as illustrated in FIG. 13, the path search portion 110 refers to the area status table 112 while standing by for the determination of a new area fault (221). When the new fault area occurs in the area B (NW2), in other words, when any one of the statuses 402 of the area status table 112 is updated from "normal" to "fault", the path search portion 110 refers to the detour path search table 113 to determine whether or not there exists a path on which the search processing of Steps 223 to 226 has not been executed among the paths (in this embodiment, Path1 and Path2) passing through the area B (NW2) (222).

When the path on which the search processing has not been executed exists, the path search portion 110 retrieves the routing edge node (before change) 421 corresponding to the path (in this embodiment, Path1) having the highest priority as the priority 442 of the path priority table 114 (223). The path search portion 110 according to the first embodiment searches the detour path search table 113 of FIG. 5 to retrieve the entry having "2, 3, 4, 5" (in other words, Path1) as the routing edge node (before change) 421.

After Step 223, the path search portion 110 confirms that the fault area 422 is the area (the area B (NW2)) determined as the fault area newly in Step 221 (224). Then, the path search portion 110 retains "1" as the selection priority of the detour path to be searched for. In other words, the value of the highest priority is retained (225).

After Step 225, based on the selection priority of the detour path to be searched for, the path search portion 110 refers to a field of the normal area 424 of the entry 426 in which "1" is stored as the selection priority 423. Then, the path search portion 110 refers to the area status table 112 to determine the statuses of the area A (NW1), the area E (NW5), and the area C (NW3) indicated by the normal area 424 that has been referred to.

Specifically, the path search portion 110 refers to the status 402 of the entry including the area 401 corresponding to the value stored as the normal area 424 of the entry 426 to determine whether or not the respective areas indicated by the normal area 424 are normal (226).

When it is determined that all the areas indicated by the normal area 424 are normal to satisfy the condition for the normal area 424, the path search portion 110 searches for the detour path passing through the nodes 7, 15, 16, and 10 stored as the routing edge node (after change) 425 (Step 227 and Sequence 803 illustrated in FIG. 11). Specifically, the path search portion 110 searches for the path between the node 1 and the node 7 within the area A (NW1), the path between the node 15 and the node 16 within the area E (NW5), and the path between the node 10 and the node 6 within the area C.

Used as a search method for the path used in Step 227 is a general path search method such as, for example, a Dijkstra method.

After Step 227, the path search portion 110 determines whether or not the detour path has been detected by the processing of Step 227 (228). When it is determined that the detour path has been detected, the path search portion 110 transmits an abolishing request for the active path to the respective nodes through which the active path passes, and further transmits an opening request for the detour path for the respective nodes through which the detour path passes (Step 229 and Sequences 804, 805, and 806 illustrated in FIG. 11). Accordingly, a detected detour path (detour path passing through the nodes 7, 15, 16, and 10; Path1') is opened as the active path.

It should be noted that, in accordance with an instruction issued from the network management apparatus 33, the path setting processing portion 128 of the node opens a new path and stores information relating to the path into the path setting table 131.

When the detour path is not detected in Step 228, the path search portion 110 increments the value of the selection priority to be used for the search. Then, the path search portion 110 determines whether or not the selection priority that has been incremented is stored in the detour path search table 113, in other words, whether or not the selection priority that has been incremented is stored as the selection priority 423 of the entry of the routing edge node (before change) 421 corresponding to the active path (Path1) regarding which the search is being performed (230), and when the selection priority that has been incremented is stored in the detour path search table 113, repeats the processing of Steps 226 to 228.

After the network management apparatus 33 opens the detour path Path1' for Path1 by the processing of Step 229 in the above-mentioned example, the path search portion 110 returns to Step 222, and the processing of Step 223 and the subsequent steps is executed on Path2 having the next-highest priority 442.

In Step 223, the path search portion 110 refers to the detour path search table 113 of FIG. 5, and retrieves the entry whose routing edge node (before change) 421 is "14, 8, 9, 17" (in other words, Path2).

After Step 223, the path search portion 110 confirms that the fault area 422 is the area B (NW2) in which the area fault is newly detected in Step 221 (224). Then, "1" is retained as the selection priority of the detour path to be searched for. In other words, the value of the highest-priority is retained (225).

After Step 225, the path search portion 110 refers to the area status table 112 to determine the statuses 402 of the area D (NW4), the area H (NW8), and the area F (NW6) that are stored in the field of the normal area 424 of the entry 428 in which "1" is stored as the selection priority 423. Specifically, the path search portion 110 refers to the status 402 of the entry including the area 401 corresponding to the value stored as the normal area 424 of the entry 428 to determine whether or not the respective areas indicated by the normal area 424 are normal (226).

The entry 410 of the area status table 112 illustrated in FIG. 4 indicates that the status 402 of the area H is "fault", and hence the path search portion 110 determines that the respective areas indicated by the normal area 424 are not normal in Step 226. Then, the procedure advances to Step 230 without performing the search processing (Step 227) for the detour path passing through the area H.

After Step 226 or Step 228, the path search portion 110 increments the value retained as the selection priority of the detour path to be searched for. Then, the path search portion 110 determines whether or not the value of the selection priority 423 that has been incremented is stored in the detour path search table 113, in other words, whether or not the value of the selection priority 423 that has been incremented is stored as the selection priority 423 of the entry of the routing edge node (before change) 421 corresponding to the active path (Path2) regarding which the search is being performed (230).

When the value of the selection priority 423 that has been incremented is not stored, the path search portion 110 determines that the detour path cannot be detected, and returns to Step 222 in order to search for the detour path for the new active path. Further, when the value of the selection priority 423 that has been incremented is stored, the path search portion 110 performs the processing of Step 226 and the subsequent steps again in order to search for a candidate for another detour path.

In the above-mentioned example, the path search portion 110 performs the processing of Step 226 for the entry 428, and then executes the processing of Step 226 for the entry 429. Specifically, the path search portion 110 refers to the area status table 112 to determine the statuses 402 of the area D (NW4), the area G (NW7), and the area F (NW6) that are stored in the field of the normal area 424 of the entry 429 in which "2" is stored as the selection priority 423 of the detour path search table 113.

All the statuses 402 of the area D (NW4), the area G (NW7), and the area F (NW6) are "normal", and hence, in Step 227, the path search portion 110 searches for the path passing through the nodes 23, 27, 28, and 24 (Path2') stored as the routing edge node (after change) 425. Specifically, the path search portion 110 searches for the path between the node 13 and the node 23 within the area D (NW4), the path between the node 27 and the node 28 within the area G (NW7), and the path between the node 24 and the node 18 within the area F.

Used as the search method for the path used in Step 227 is a general path search method such as, for example, a Dijkstra method.

When the path is detected by the processing of Step 227, the path search portion 110 transmits the abolishing request for the active path to the respective nodes through which the active path passes, and with the detected path set as the detour path, further transmits the opening request for the detour path for the respective nodes through which the detour path passes (Step 229 and Steps 811, 812, and 813 of FIG. 11). Accordingly, the detected detour path (detour path passing through the nodes 23, 27, 28, and 24; Path2') is opened as the active path.

When the detour path is not detected in Step 227, the path search portion 110 increments the value retained as the selection priority of the detour path to be searched for. The processing of Steps 226 to 228 is repeated.

When the network management apparatus 33 opens a detour path Path2' for Path2 by the above-mentioned processing, the path search portion 110 returns to Step 222. When there is no path left unsearched as the detour path in the detour path search table 113, the procedure returns to Step 221, and the path search portion 110 stands by for the determination of a new area fault.

According to the above-mentioned processing, the network management apparatus 33 refers to the area status table 112 to determine whether the area indicated by the normal area 424 of the detour path search table 113 is normal or abnormal, and further executes search processing 227 for the detour path. This can avoid the processing (Step 227) for searching for the detour path with regard to the fault area, and can reduce load on the network management apparatus 33 involved in detour path search processing. In addition, it is possible to shorten the service interruption time after the fault occurs in the active path until a search is performed for the detour path and the detour path detected by the search is opened.

Further, by the processing of the detour path search table configuration portion 117, when the fault occurs in the active path regarding which the routing edge node (before change) 421 is "2, 3, 4, 5" in the detour path search table 113, the path search portion 110 searches for the detour path passing through the area E preferentially to the detour path passing through the area G based on the selection priority 423. On the other hand, when the fault occurs in the active path regarding which the routing edge node (before change) 421 is "14, 8, 9, 17", the path search portion 110 searches for the detour path passing through the area G preferentially to the detour path passing through the area E based on the selection priority 423.

This can avoid the concentration of the bandwidth on a specific area as a result of opening the detour path, and hence the network management apparatus 33 can reduce the occurrence of the case where the opening becomes impossible due to the insufficient bandwidth and a search is performed for another area again. Accordingly, it is possible to reduce the detour path search processing load on the network management apparatus 33, and it is also possible to shorten the service interruption time after the fault occurs in the active path until the network management apparatus 33 opens the detour path.

Second Embodiment

A second embodiment of this invention is described below with reference to the accompanying drawings by focusing on differences from the first embodiment. The second embodiment has a feature of dividing the areas of a bandwidth guarantee network according to this embodiment in a plurality of tiers.

Figure 14:
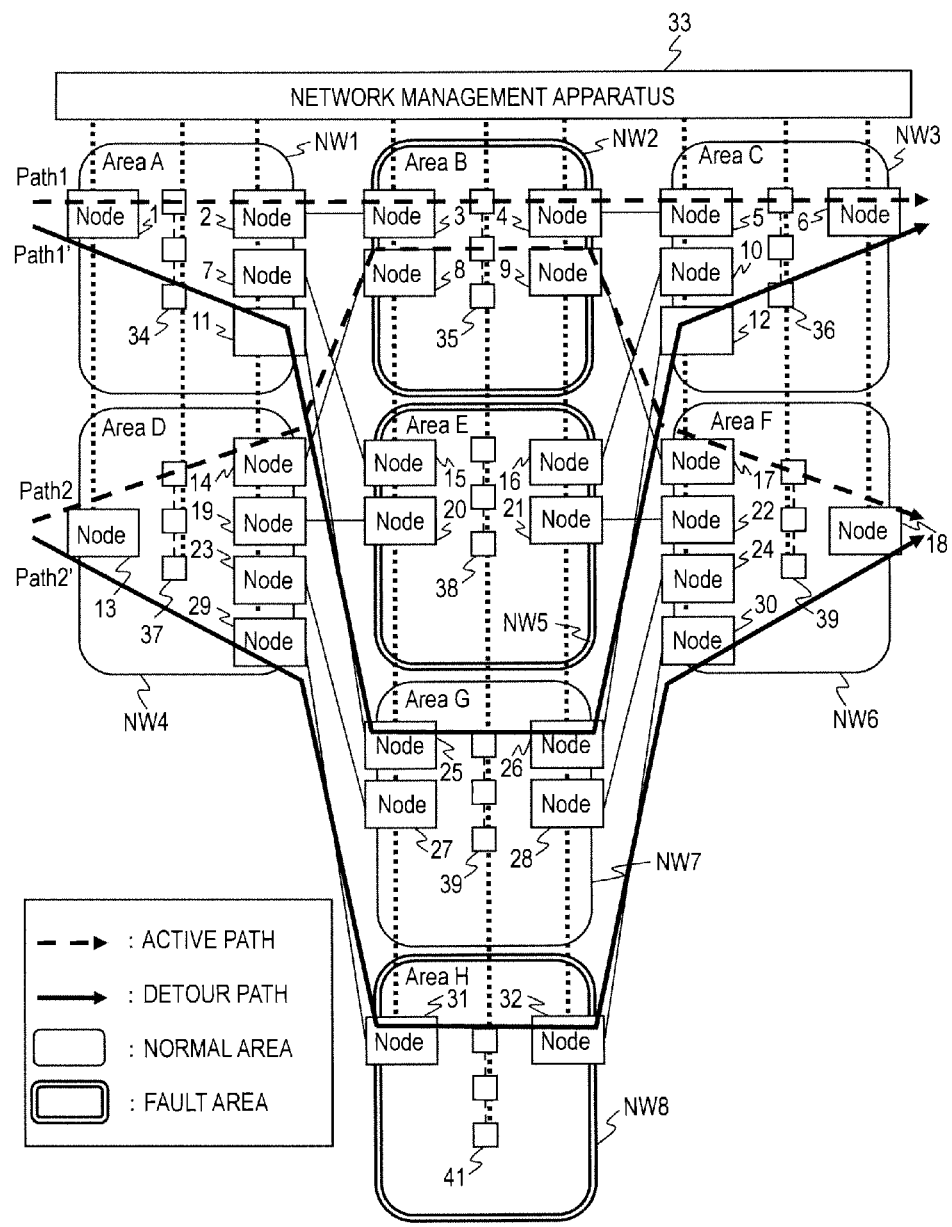
FIG. 14 is a block diagram illustrating a communication system in a low tier according to a second embodiment of this invention.

FIG. 14 is a block diagram illustrating a communication system in a low tier according to the second embodiment of this invention.

The communication system illustrated in FIG. 14 includes the bandwidth guarantee network and the network management apparatus 33 in the same manner as in the first embodiment. Further, FIG. 14 illustrates the communication system obtained when the network management apparatus 33 determines that the area B (NW2) and the area E (NW5) are the fault areas. In the second embodiment, the areas illustrated in FIG. 14 are referred to as areas in a tier 1.

Path1 and Path2 of FIG. 14 are the paths for the communication data of the end user in the same manner as in the first embodiment. Path1 and Path2 pass through the area B.

Path1' and Path2' of FIG. 14 are the detour paths for Path1 and Path2. A procedure for searching for Path1' and Path2' is described later.

Figure 15:
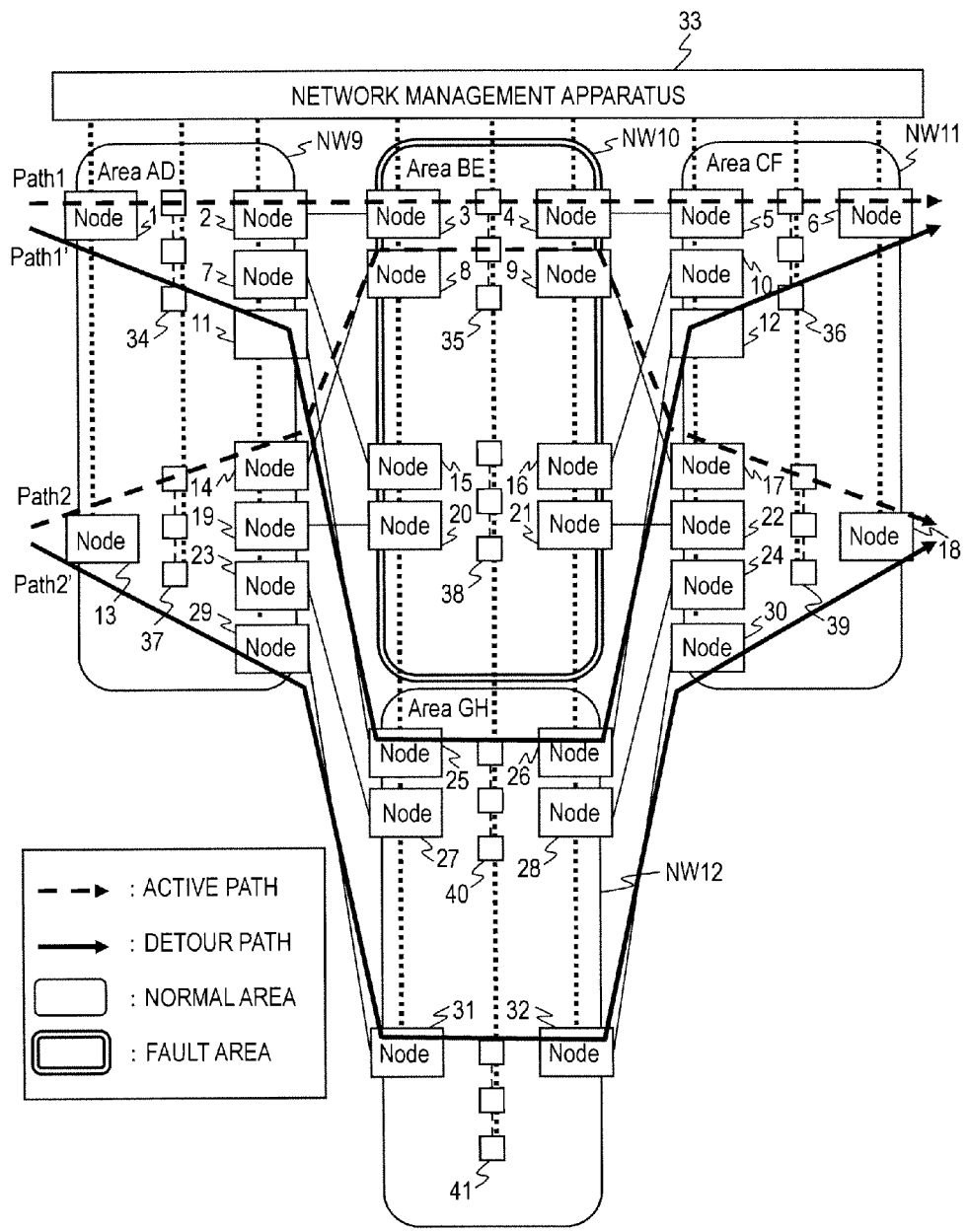
FIG. 15 is a block diagram illustrating a communication system in a high tier according to the second embodiment of this invention.

FIG. 15 is a block diagram illustrating a communication system in a high tier according to the second embodiment of this invention.

The areas illustrated in FIG. 15 are areas that are managed by the network management apparatus 33 and have a granularity different from the tier 1. The areas illustrated in FIG. 15 are referred to as areas in a tier 2.

The area in the tier 2 includes a plurality of areas in the tier 1. Specifically, the network management apparatus 33 defines an area AD (NW9) by combining the area A and the area D, defines an area BE (NW10) by combining the area B and the area E, defines an area CF (NW11) by combining the area C and the area F, and defines an area GH (NW12) by combining the area G and the area H.

The network management apparatus 33 according to the second embodiment generates areas different in granularity on a tier-to-tier basis, and generates entries in the detour path search table 113 for each tier. Then, by imposing a limitation on a detour path search range in the tier (tier 1) having a fine area granularity, it is possible to localize an influence on the whole bandwidth guarantee network due to the opening of the detour path in a case of the wide-area disaster having a relatively small scale. Then, in a case of the wide-area disaster having a large scale, it is possible to search for the detour path in the tier (tier 2) having a coarse area granularity. This enables the opening of the detour path which allows the influence to be localized as much as possible in accordance with a disaster scale.

It should be noted that the network management apparatus 33 according to the second embodiment includes the processing portions and the data that are illustrated in FIG. 2 in the same manner as the network management apparatus 33 according to the first embodiment. Further, the nodes 1 to 32 and the node groups 34 to 41 according to the second embodiment include the processing portions and the data that are illustrated in FIG. 3 in the same manner as in the first embodiment.

FIG. 16 is an explanatory diagram illustrating an area status table 112 according to the second embodiment of this invention.

The area status table 112 according to the second embodiment stores information obtained by associating a tier 501, an area 502, and a status 503 with one another. The tier 501 indicates tiers in which the areas are divided by the network management apparatus 33. The area 502 and the status 503 are the same as the area 401 and the status 402, respectively, of the area status table 112 according to the first embodiment.

FIG. 16 illustrates the area status table 112 obtained when the network management apparatus 33 determines that the area B (NW2) and the area E (NW5) are in a fault status in the tier 1 and that the area BE (NW10) is in a fault status in the tier 2. Further, the area status table 112 of FIG. 16 includes entries 504 to 515.

By managing the status 503 of the area 502 for each tier 501, the network management apparatus 33 can search for the detour path in an appropriate tier 501 in accordance with the disaster scale.

FIG. 17 is an explanatory diagram illustrating a detour path search table 113 according to the second embodiment of this invention.

The detour path search table 113 according to the second embodiment includes a tier 521, a routing edge node (before change) 522, a fault area 523, a selection priority 524, a normal area 525, and a routing edge node (after change) 526. The routing edge node (before change) 522, the fault area 523, the selection priority 524, the normal area 525, and the routing edge node (after change) 526 are the same as the routing edge node (before change) 421, the fault area 422, the selection priority 423, the normal area 424, and the routing edge node (after change) 425, respectively, according to the first embodiment. The second embodiment is different from the first embodiment only in that the entries are generated for each tier 521.

The smaller selection priority 524 means the higher priority in the same manner as the selection priority 423 according to the first embodiment. Further, the detour path search table 113 illustrated in FIG. 17 includes entries 527 to 531.

To generate the entry in a low tier 521 (in other words, whose value is small) by the processing illustrated in FIG. 10, the detour path search table configuration portion 117 generates the entry in Step 272 so that the routing edge nodes (after change) 526 are included in the same area in the upper tier (tier 2). For example, when the fault occurs in the area B (NW1) in the tier 1, the detour path search table configuration portion 117 generates the detour path search table 113 so that the detour path passing through the area BE (NW10) in the tier 2 is set as the search target. Accordingly, it is possible to localize the influence on the bandwidth guarantee network due to the opening of the detour path in a case of a local fault that allows the detour path to be opened in a lower tier.

FIG. 18 is an explanatory diagram illustrating an area fault determination table 116 for each area according to the second embodiment of this invention.

FIG. 7 of the first embodiment and FIG. 18 of the second embodiment are different in that the area fault determination table 116 of FIG. 18 includes a field of a tier 541. The area fault determination table 116 illustrated in FIG. 18 includes entries 546 to 557.

FIG. 19 is an explanatory diagram illustrating an area fault determination table 116 for each active path according to the second embodiment of this invention.

FIG. 8 of the first embodiment and FIG. 19 of the second embodiment are different in that the area fault determination table 116 of FIG. 19 includes a field of a tier 561. The area fault determination table 116 illustrated in FIG. 19 includes entries 566 to 577.

The area fault determination table 116 includes the field of the tier 541 or the tier 561, thereby enabling the network management apparatus 33 to manage the fault statuses of the areas for each of the tiers 541 and 561.

Figure 20:
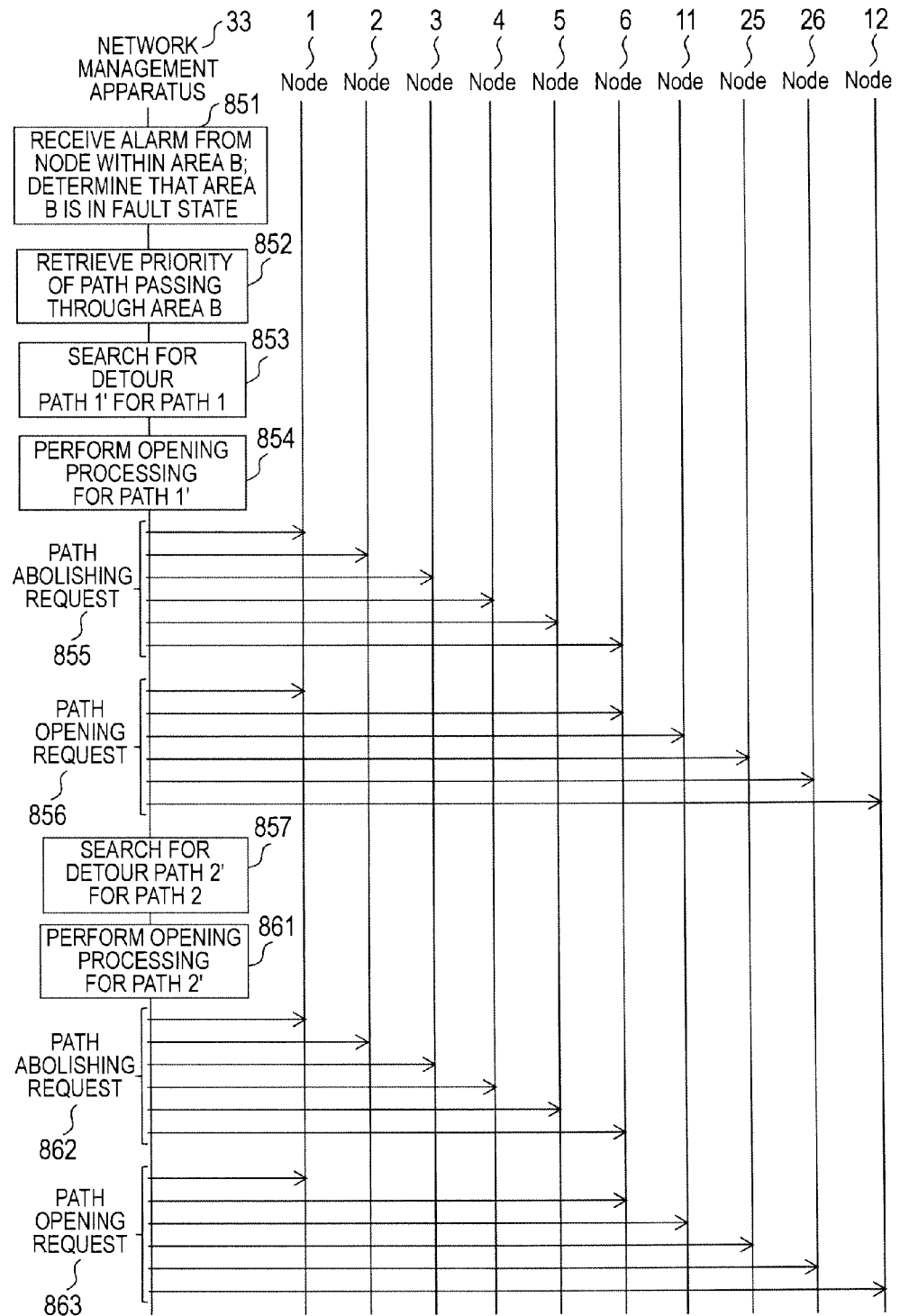
FIG. 20 is a sequence diagram illustrating a procedure for continuing a service by opening a detour path in a case where a wide-area disaster has occurred according to the second embodiment of this invention.

FIG. 20 is a sequence diagram illustrating a procedure for continuing the service by opening the detour path in the case where the wide-area disaster has occurred according to the second embodiment of this invention.

FIG. 20 illustrates a procedure for continuing the service by setting the detour path in the case where the wide-area disaster has occurred in the area B (NW2).

When the wide-area disaster occurs in the area B (NW2), the node deployed in the area B detects the fault, and notifies the network management apparatus 33 of an alarm. When the network management apparatus 33 receives the alarm from the node, the area status management portion 109 updates the area fault determination table 116 by the procedure illustrated in FIG. 12.

When the area status management portion 109 of the network management apparatus 33 determines the area B (NW2) as the fault (851), the path search portion 110 of the network management apparatus 33 refers to the path priority table 114 to extract the priority 442 of the active path passing through the area B (NW2) (852). Then, the path search portion 110 searches for the detour paths for the active paths in order from the highest priority 442, and opens the detour path detected by the search (853 to 863).

Figure 21:
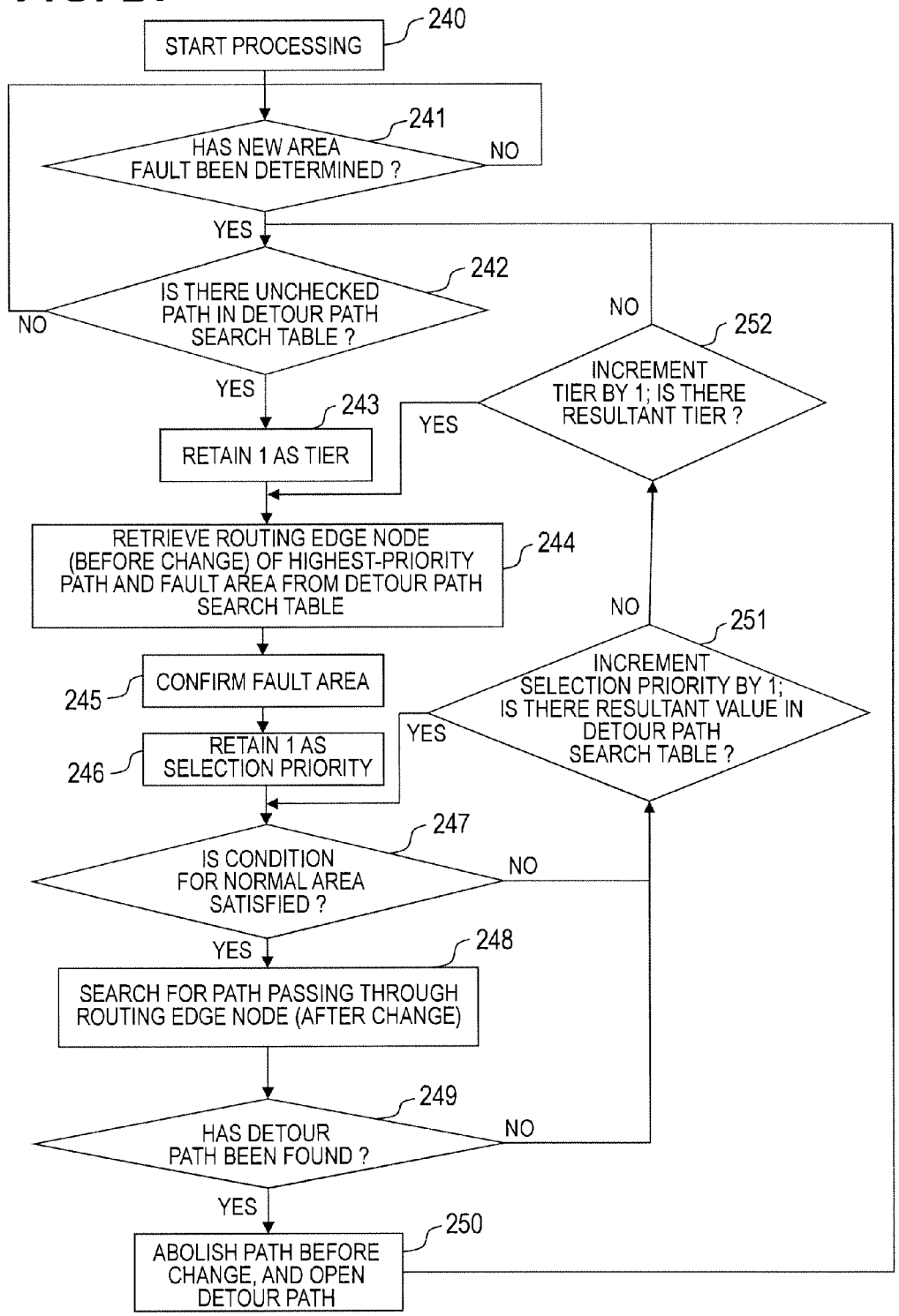
FIG. 21 is a flowchart illustrating search processing and opening processing for a detour path according to the second embodiment of this invention.

The respective processing steps of the path search portion 110 are illustrated in FIG. 21.

FIG. 21 is a flowchart illustrating search processing and opening processing for a detour path according to the second embodiment of this invention.

After the processing is started (240) as illustrated in FIG. 21, the path search portion 110 refers to the area status table 112 while standing by for the determination of a new area fault (241). When the new fault area occurs in the area B (NW2), the path search portion 110 refers to the detour path search table 113 to determine whether or not there exists an active path on which the search processing of Steps 243 to 247 has not been executed among the active paths (Path1 and Path2) passing through the area B (NW2) (242).

When the active path on which the search processing has not been executed exists, the path search portion 110 retains "1" as the value of the tier in which the detour path is to be searched for (243), and the routing edge node (before change) 522 corresponding to the active path (Path1) having the highest priority 442 is retrieved (244). When the path search portion 110 uses the detour path search table 113 of FIG. 5, Step 244 results in the entry having "2, 3, 4, 5" (Path1) as the routing edge node (before change) 522.

After Step 244, the path search portion 110 confirms that the fault area 523 is the area B (NW2) in which the area fault is newly detected (245). Then, the path search portion 110 retains "1" as the selection priority 524 of the detour path to be searched for. In other words, the value of the highest priority is retained (246).

After Step 246, the path search portion 110 refers to the area status table 112 to determine whether or not the statuses 503 of the area A (NW1), the area E (NW5), and the area C (NW3) that are indicated by the normal area 525 in the entry 527 having "1" as the selection priority 524 indicate "normal" (247).

When all of the areas indicated by the normal area 525 are "normal", the path search portion 110 searches for the path passing through the nodes stored as the routing edge node (after change) 526. The path search portion 110 determines whether or not the detour path has been detected (249), and when it is determined that the detour path has been detected, transmits the abolishing request for the active path to the respective nodes through which the active path passes. In addition, the path search portion 110 transmits the opening request for the detour path for the respective nodes through which the detour path passes (250).

After Step 250, the path search portion 110 returns to Step 242.

When it is determined in Step 249 that the detour path has not been detected, the path search portion 110 increments the selection priority of the detour path to be searched for. Then, it is determined whether or not the value of the selection priority that has been incremented is stored in the detour path search table 113 (251).

When the value of the selection priority that has been incremented is stored as the selection priority 524 of the entry of the routing edge node (before change) 522 corresponding to the active path (Path1 or Path2) regarding which the search is being performed, the path search portion 110 returns to Step 247. Further, when the value of the selection priority that has been incremented is not stored as the selection priority 524 of the entry of the routing edge node (before change) 522 corresponding to the active path (Path1 or Path2) regarding which the search is being performed, the path search portion 110 executes Step 252.

In Step 252, the path search portion 110 increments the value of the tier in which the detour path is to be searched for, and retains the value of the tier that has been incremented. Then, it is determined whether or not the value of the tier that has been incremented is stored as the tier 521 of the detour path search table 113 (252). When the value of the tier that has been incremented is stored as the tier 521 of the detour path search table 113, the path search portion 110 returns to Step 244.

When the areas indicated by the normal area 525 include the area that is not "normal" in Step 247, the path search portion 110 executes Step 251.

As a result of the above-mentioned processing, the entry 508 of the area status table 112 shows "fault" as the status of the area E. Therefore, the path search portion 110 determines in Step 247 that the areas indicated by the normal area 525 include the area that is not "normal" with regard to Path1 and Path2. For this reason, the path search portion 110 searches for the detour path in the tier 2, and opens Path1' and Path2' that are illustrated in FIG. 15 as the detour path for Path1 and the detour path for Path2, respectively.

In the above-mentioned example, the area E (NW5) is in a fault status, and hence the detour paths for both Path1 and Path2 are opened in the tier 2, but when the area E (NW5) is in a normal status, the detour paths passing through the area E (NW5) are opened in the tier 1. As a result, it is possible to set the detour path which allows a range of the influence on the bandwidth guarantee network to be localized as much as possible in accordance with a scale of the wide-area disaster.

Further, in the above-mentioned example, in Step 243 of FIG. 21, the search for the detour path is first performed with regard to the tier 1, and when the detour path is not detected in the tier 1, the search for the detour path is performed with regard to the tier 2. However, the area status management portion 109 may determine the fault only in the area BE (NW10) in the tier 2, thereby omitting the processing of Step 244 and the subsequent steps with regard to the tier 1 to immediately perform the processing of Step 244 and the subsequent steps with regard to the tier 2. This can omit the processing of Steps 244 to 247 with regard to the tier 1, which can reduce the processing load on the network management apparatus 33 and can shorten the time required for the search processing.

According to the second embodiment, the network management apparatus 33 retains the information indicating the areas divided by different granularities on a tier-to-tier basis, and detects the detour path in order from the areas divided by the finer granularity, which can localize the influence on the bandwidth guarantee network according to this embodiment as much as possible.

According to this embodiment, the network management apparatus 33 retains the area status table 112 showing fault situations of the respective areas and the detour path search table 113 for each fault area, and when detecting the fault in a specific area, refers to the detour path search table 113 to search for and determine the detour path. Accordingly, in the search for the detour path, the network management apparatus 33 can exclude, from a search condition, a candidate for the detour path for which it is determined that the detour path does not exist (or the detour path should not be opened) based on the fault status of the area.

Further, according to this embodiment, the selection priorities are assigned to a plurality of candidates for the detour paths, thereby enabling the network management apparatus 33 to evenly set a search target range for the detour paths. For this reason, in the detour path search, the number of times that the search fails due to the insufficient bandwidth resource or other such reason is reduced. As a result, it is possible to reduce a search time and recover important communications in a short service interruption time. In addition, the network management apparatus 33 can search for the detour path with low processing load.

From the invention thus described, it will be obvious that the embodiments of the invention may be varied in many ways. For example, some elements of an embodiment may be omitted, replaced with elements of another embodiment or added to another embodiment without departing from the scope and spirit of the invention. Such variations are not to be regarded as a departure from the spirit and scope of the invention, and all such modifications as would be obvious to one skilled in the art are intended for inclusion within the scope of the following claims.

What is claimed is:

1. A communication system, comprising:
a plurality of network devices; and
a network management apparatus configured to be coupled to the plurality of network devices, wherein:
the plurality of network devices are classified into a plurality of areas;
each of the plurality of areas comprises an edge node, which is one of the plurality of network devices through which a path passing through each of the plurality of areas passes first in each of the plurality of areas, and an edge node, which is one of the plurality of network devices through which the path passes last in each of the plurality of areas;
the network management apparatus comprises:
a processor;
a memory; and
an interface; and
the network management apparatus is configured to:
retain, in the memory, detour path information comprising values indicating areas through which an active path passes, values indicating one or more alternative areas through which a detour path corresponding to the active path passes, and values indicating edge nodes of the one or more areas through which the detour path passes;
determine an alternative area of an area through which the active path passes based on a predetermined condition with reference to the detour path information;
determine edge nodes included in the determined alternative area based on the detour path information; and detect network devices through which a detour path passes between the determined edge nodes.

2. The communication system according to claim 1, wherein the network management apparatus is further configured to:
identify an alternative area assigned a higher priority more preferentially as the alternative area to each area in which a fault has occurred;
calculate, in a case where a value of a same alternative area as an alternative area whose value is added to the detour path information is already included, total sums of priorities assigned to the alternative areas based on the priorities assigned to the alternative areas included in the detour path information; and
determine the priority to be assigned to the alternative area whose value is added so that the calculated total sums of priorities become even.

3. The communication system according to claim 2, wherein the network management apparatus is further configured to:
receive notifications indicating whether or not the plurality of network devices are in a fault status;
retain, in the memory, determination information comprising a number of network devices included in each of the plurality of areas, a number of network devices that are in the fault status among the network devices included in each of the plurality of areas, and a first threshold value defined in advance;
calculate a first ratio by dividing a number of network devices that are in the fault status among network devices included in a first area by a number of network devices included in the first area; and
control, in a case where the first ratio is larger than the first threshold value as a result of a comparison between the first ratio and the first threshold value, fault information to comprise a value indicating that the fault has occurred in the first area.

4. The communication system according to claim 3, wherein:
the network management apparatus receives a notification indicating whether or not the active path is in the fault status;
the determination information further comprises a number of active paths passing through each of the plurality of areas, a number of active paths that are in the fault status among the active paths passing through each of the plurality of areas, and a second threshold value defined in advance; and
the network management apparatus is further configured to:
calculate a second ratio by dividing a number of active paths that are in the fault status among active paths passing through the first area by a number of active paths passing through the first area; and
control, in a case where the second ratio is larger than the second threshold value as a result of a comparison between the second ratio and the second threshold value, the fault information to further comprise the value indicating that the fault has occurred in the first area.

5. The communication system according to claim 4, wherein:
the determination information further comprises a number of second active paths selected in advance, a number of second active paths that are in the fault status among the second active paths, and a third threshold value defined in advance; and
the network management apparatus is further configured to:
calculate a third ratio by dividing a number of second active paths that are in the fault status among second active paths passing through the first area by a number of second active paths passing through the first area; and
control, in a case where the third ratio is larger than the third threshold value as a result of a comparison between the third ratio and the third threshold value, the fault information to further comprise the value indicating that the fault has occurred in the first area.

6. A communication method for use in a communication system,
the communication system comprising:
a plurality of network devices; and
a network management apparatus configured to be coupled to the plurality of network devices,
the plurality of network devices being classified into a plurality of areas,
each of the plurality of areas comprising an edge node, which is one of the plurality of network devices through which a path passing through each of the plurality of areas passes first in each of the plurality of areas and an edge node, which is one of the plurality of network devices through which the path passes last in each of the plurality of areas,
the network management apparatus comprising:
a processor;
a memory; and
an interface,
the communication method comprising:
retaining, by the memory, detour path information comprising, values indicating areas through which an active path passes, values indicating one or more alternative areas through which a detour path corresponding to the active path passes, and values indicating edge nodes of the one or more areas through which the detour path passes;
determining an alternative area of an area through which the active path passes based on a predetermined condition with reference to the detour path information;
determining, by the processor, edge nodes included in the determined alternative area based on the detour path information; and
detecting, by the processor, the respective network devices through which a detour path passes between the determined edge nodes.

7. The communication method according to claim 6, further comprising:
identifying, by the processor, the alternative area assigned a higher priority more preferentially as the alternative area to each area in which the fault has occurred;
calculating, by the processor, in a case where a value of a same alternative area as an alternative area whose value is added to the detour path information is already included, total sums of priorities assigned to the alternative areas based on the priorities assigned to the alternative areas included in the detour path information; and
determining, by the processor, the priority to be assigned to the alternative area whose value is added so that the calculated total sums of priorities become even.

8. The communication method according to claim 7, further comprising:
receiving, by the interface, notifications indicating whether or not the plurality of network devices are in a fault status;

retaining, by the memory, determination information comprising a number of network devices included in each of the plurality of areas, a number of network devices that are in the fault status among the network devices included in each of the plurality of areas, and a first threshold value defined in advance;

calculating, by the processor, a first ratio by dividing a number of network devices that are in the fault status among network devices included in a first area by a number of network devices included in the first area; and controlling, by the processor, in a case where the first ratio is larger than the first threshold value as a result of a comparison between the first ratio and the first threshold value, fault information to comprise a value indicating that the fault has occurred in the first area.

9. The communication method according to claim 8, further comprising: receiving, by the interface, a notification indicating whether or not the active path is in the fault status, wherein:

the determination information further comprises a number of active paths passing through each of the plurality of areas, a number of active paths that are in the fault status among the active paths passing through each of the plurality of areas, and a second threshold value defined in advance; and the communication method further comprises:

calculating, by the processor, a second ratio by dividing a number of active paths that are in the fault status among active paths passing through the first area by a number of active paths passing through the first area; and controlling, by the processor, in a case where the second ratio is larger than the second threshold value as a result of a comparison between the second ratio and the second threshold value, the fault information to further comprise the value indicating that the fault has occurred in the first area.

10. The communication method according to claim 9, wherein:

the determination information further comprises a number of second active paths extracted in advance, a number of second active paths that are in the fault status among the second active paths, and a third threshold value defined in advance; and the communication method further comprises:

calculating, by the processor, a third ratio by dividing a number of second active paths that are in the fault status among second active paths passing through the first area by a number of second active paths passing through the first area; and controlling, by the processor, in a case where the third ratio is larger than the third threshold value as a result of a comparison between the third ratio and the third threshold value, the fault information to further comprise the value indicating that the fault has occurred in the first area.

11. A network management apparatus configured to be coupled to a plurality of network devices, the plurality of network devices being classified into a plurality of areas, each of the plurality of areas comprising an edge node, which is one of the plurality of network devices through which a path passing through each of the plurality of areas passes first in each of the plurality of areas and an edge node, which is one of the plurality of network devices through which the path passes last in each of plurality of the areas, the network management apparatus comprising:
a processor;
a memory; and
an interface, the network management apparatus being configured to:

retain, in the memory, detour path information comprising values indicating areas through which an active path passes, values indicating one or more alternative areas through which a detour path corresponding to the active path passes, and values indicating edge nodes of the one or more areas through which the detour path passes;

determine an alternative area of an area through which the active path passes based on a predetermined condition with reference to the detour path information;

determine edge nodes included in the determined alternative area based on the detour path information; and detect network devices through which a detour path passes between the determined edge nodes.

12. The network management apparatus according to claim 11, wherein the network management apparatus is further configured to:

identify an alternative area assigned a higher priority more preferentially as the alternative area to each area in which the fault has occurred;

calculate, in a case where a value of a same alternative area as an alternative area whose value is added to the detour path information is already included, total sums of priorities assigned to the alternative areas based on the priorities assigned to the alternative areas included in the detour path information; and determine the priority to be assigned to the alternative area whose value is added so that the calculated total sums of priorities become even.

13. The communication system according to claim 1, wherein the network management apparatus is further configured to:

retain, in the memory, fault information comprising values indicating the plurality of areas and values each indicating whether or not a fault has occurred in each of the plurality of areas;

retain, in the detour path information, a priority assigned to each alternative area;

determine whether or not the fault has occurred in each of the plurality of areas based on the fault information;

determine, in a case where it is determined that a fault has occurred in a first area, the alternative area based on the detour path information;

determine whether or not a fault has occurred in the determined alternative area based on the fault information;

determine, in a case where it is determined that the fault has not occurred in the determined alternative area, the determined alternative area as an area through which the detour path passes;

determine the edge nodes included in the determined alternative area based on the detour path information;

detect the network devices through which the detour path passes between the determined edge nodes; and transmit an opening request to each of the network devices.

14. The communication method according to claim 6, further comprising:

retaining, in the memory, fault information comprising values indicating the plurality of areas and values each indicating whether or not a fault has occurred in each of the plurality of areas;

retaining, in the detour path information, a priority assigned to each alternative area;

determining whether or not the fault has occurred in each of the plurality of areas based on the fault information;

determining, in a case where it is determined that a fault has occurred in a first area, the alternative area based on the detour path information;

determining whether or not a fault has occurred in the determined alternative area based on the fault information;

determining, in a case where it is determined that the fault has not occurred in the determined alternative area, the determined alternative area as an area through which the detour path passes;

determining the edge nodes included in the determined alternative area based on the detour path information;

detecting the network devices through which the detour path passes between the determined edge nodes; and transmitting an opening request to each of the network devices.

15. The network management apparatus according to claim 11, wherein the network management apparatus is further configured to:

retain, in the memory, fault information comprising values indicating the plurality of areas and values each indicating whether or not a fault has occurred in each of the plurality of areas;

retain, in the detour path information, a priority assigned to each alternative area;

determine whether or not the fault has occurred in each of the plurality of areas based on the fault information;

determine, in a case where it is determined that a fault has occurred in a first area, the alternative area based on the detour path information;

determine whether or not a fault has occurred in the determined alternative area based on the fault information;

determine, in a case where it is determined that the fault has not occurred in the determined alternative area, the determined alternative area as an area through which the detour path passes;

determine the edge nodes included in the determined alternative area based on the detour path information;

detect the network devices through which the detour path passes between the determined edge nodes; and transmit an opening request to each of the network devices.

* * * * *